(12) United States Patent
Takahashi

(10) Patent No.: US 7,844,810 B2
(45) Date of Patent: Nov. 30, 2010

(54) COMPUTER SYSTEM AND BOOTING METHOD THEREFOR AND SERVER USED FOR STREAMING ON-DEMAND A REMAINING PART OF A BOOT-UP MAIN MEMORY IMAGE THAT INCLUDES AN OPERATING SYSTEM

(75) Inventor: Masahiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1531 days.

(21) Appl. No.: 11/109,742

(22) Filed: Apr. 20, 2005

(65) Prior Publication Data

US 2005/0246518 A1  Nov. 3, 2005

(30) Foreign Application Priority Data

Apr. 30, 2004  (JP)  ............................... 2004-135278

(51) Int. Cl.
*G06F 9/00* (2006.01)
(52) U.S. Cl. .......................................... 713/2; 709/231
(58) Field of Classification Search ...................... 713/2; 709/231
See application file for complete search history.

(56) References Cited

U.S. PATENT DOCUMENTS

| 5,444,850 A | 8/1995 | Chang |
| 6,546,485 B1* | 4/2003 | Tsunedomi et al. ......... 713/100 |
| 6,611,915 B1* | 8/2003 | Kubik et al. ................. 709/211 |
| 7,321,936 B2* | 1/2008 | Zimmerman et al. ........ 709/231 |
| 7,487,342 B2* | 2/2009 | Cronk et al. .................... 713/1 |
| 2004/0010734 A1* | 1/2004 | Ghercioiu et al. ............. 714/38 |

FOREIGN PATENT DOCUMENTS

| JP | 3-97029 (A) | 4/1991 |
| JP | 03-278126 | 12/1991 |
| JP | 6-208467 (A) | 7/1994 |
| JP | 10-293619 (A) | 11/1998 |
| JP | 10-511783 (A) | 11/1998 |
| JP | 2004-38546 (A) | 2/2004 |
| WO | WO 03/090109 A1 | 10/2003 |

OTHER PUBLICATIONS

H. Stern, "NFS & NIS," ASCII Corporation, Dec. 1, 1992, pp. 219-232.

* cited by examiner

*Primary Examiner*—Albert Wang
(74) *Attorney, Agent, or Firm*—Foley & Lardner LLP

(57) ABSTRACT

To accelerate the booting time of a computer by a booting method using a communication network, a boot-up main memory image of an OS and application programs is used to boot a computer. The main memory image is managed in one batch on a server, and is regularly updated with the latest programs. When booting up the computer, only an initial load image which is the minimum part of the main memory image necessary to start the system is loaded, and remaining parts of the main memory image are suitably loaded in an on-demand manner after the system starts operating.

16 Claims, 18 Drawing Sheets

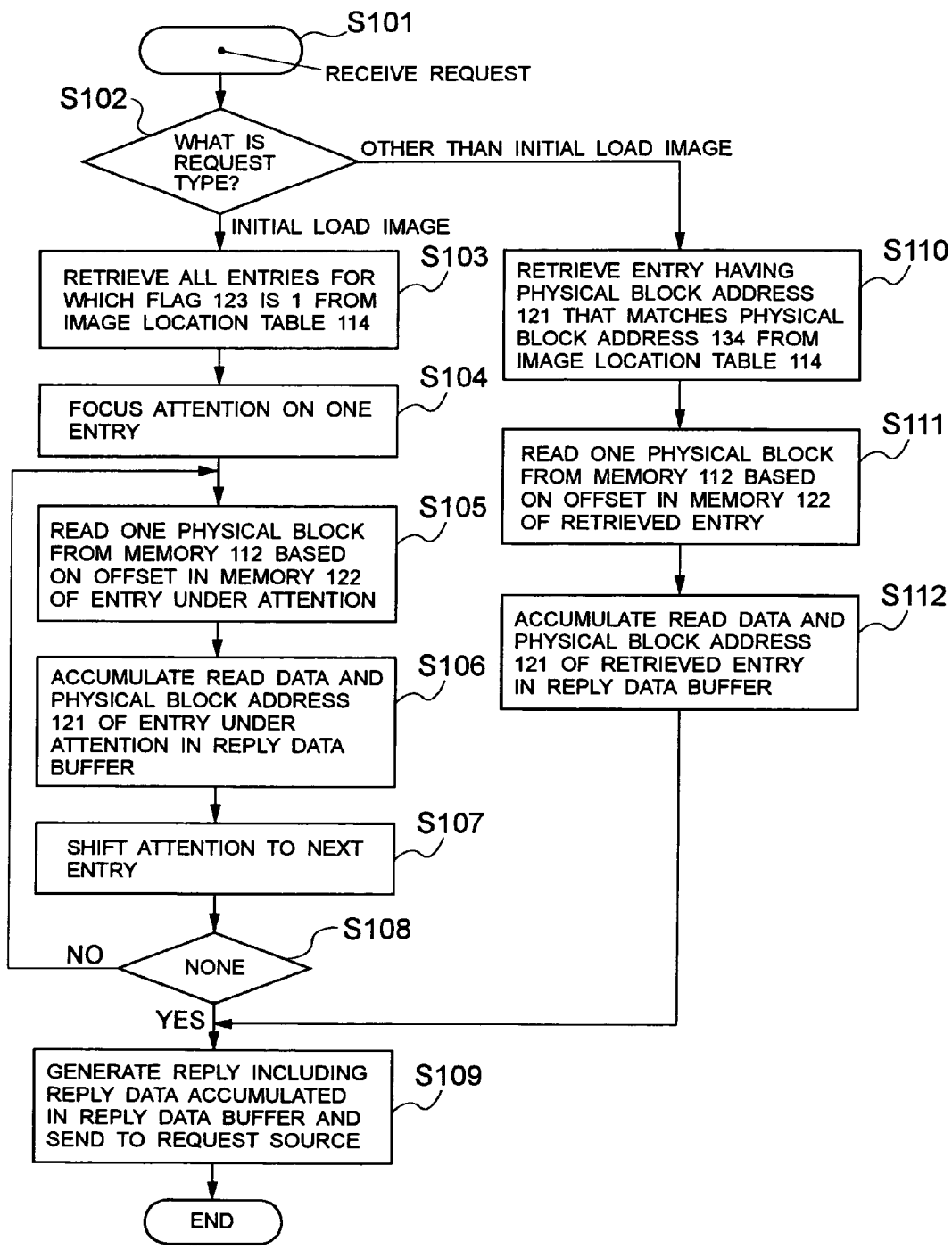

FIG. 10

| PHYSICAL BLOCK ADDRESS | OFFSET IN MEMORY | FLAG |
|---|---|---|
| 1 | 0x1000 | 1 |
| 2 | 0x2000 | 1 |
| 3 | 0x3000 | 0 |
| 4 | 0x4000 | 0 |
| 5 | 0x5000 | 0 |
| 6 | 0x6000 | 1 |

FIG. 11

158 PROTECTION INFORMATION UNIT

| LOGICAL BLOCK ADDRESS | PROTECTION ATTRIBUTE | LOCATION ATTRIBUTE |
|---|---|---|
| 0 | R | SERVER |
| 1 | R | SERVER |
| 2 | R | SERVER |
| 3 | RW | SERVER |
| 4 | RW | SERVER |
| 5 | RW | SERVER |
| 6 | RW | LOCAL |

| LOGICAL BLOCK ADDRESS | PHYSICAL BLOCK ADDRESS | PROTECTION MODE |
|---|---|---|
| 0 | 1 | R |
| 1 | 2 | R |
| 2 | 3 | NULL |
| 3 | 4 | NULL |
| 4 | 5 | NULL |
| 5 | 6 | RW |
| 6 | 7 | RW |

BEFORE PAGE TABLE CHANGE

| LOGICAL BLOCK ADDRESS | PHYSICAL BLOCK ADDRESS | PROTECTION MODE |
|---|---|---|
| 0 | 1 | R |
| 1 | 2 | R |
| 2 | 3 | NULL |
| 3 | 4 | RW |
| 4 | 5 | NULL |
| 5 | 6 | RW |
| 6 | 7 | RW |

AFTER PAGE TABLE CHANGE

FIG. 20

| PHYSICAL BLOCK ADDRESS | OFFSET IN MEMORY | FLAG |
|---|---|---|
| 256 | 0x256000 | 1 |
| ⋮ | ⋮ | 0 |
| 300 | 0x300000 | 0 |
| 301 | 0x301000 | 1 |
| ⋮ | ⋮ | 0 |
| 400 | 0x400000 | 0 |

FIG. 21

314 PROTECTION INFORMATION UNIT

| BLOCK ADDRESS | PROTECTION ATTRIBUTE | LOCATION ATTRIBUTE |
|---|---|---|
| 256 | R | SERVER |
| ⋮ | R | SERVER |
| 300 | R | SERVER |
| 301 | RW | SERVER |
| ⋮ | RW | SERVER |
| 400 | RW | SERVER |
| ⋮ | RW | LOCAL |
| 511 | RW | LOCAL |

COMPUTER SYSTEM AND BOOTING METHOD THEREFOR AND SERVER USED FOR STREAMING ON-DEMAND A REMAINING PART OF A BOOT-UP MAIN MEMORY IMAGE THAT INCLUDES AN OPERATING SYSTEM

BACKGROUND OF THE INVENTION

1. Field of the Invention

The present invention relates to a computer system and a booting method therefor and a server used for the same, and more particularly to a system for booting a computer using a program loaded through a network.

2. Description of the Prior Art

In general, the order of processing when booting a computer is that first a hardware is initialized, next an operating system (hereunder, referred to as "OS") is started up, and finally required application programs are launched.

Here, upon starting up the OS and the application programs excluding initialization of the hardware, first, a processing which reads these programs is performed, and next the initialization processing described in the programs is performed. After the initialization processing is completed, the operation processing which is the function of the original purpose of the programs can be carried out.

Specifically, processing to read the OS is performed by an IPL (Initial Program Loader) which carries out operations to load the OS program from a memory. Loading is also performed from a memory or storage when loading an application program. Incidentally, in this case, a loading subject is the OS. At this time, in addition to a method whereby a program is loaded from a local hard disk drive (HDD) of the computer, a method is available in which a program is loaded through a network. An operation in which booting a computer system is performed by loading the OS program through the network is referred to as "network boot" (for example, see Non-Patent Document 1).

By using the network boot, even if a computer does not have a local HDD, the system can be booted by loading the OS program from a server which supplies the programs. Therefore, OS and application programs and the like which had been installed on the local HDD of respective computers can be managed on the centralized server. This allows the programs to be kept updated to the most recent versions to enable prevention of security holes and computer virus attacks. In this case, even if the number of computers increases there is no additional cost required to manage the programs. Further, by providing programs of a plurality of systems on the server, it is possible to set on the server which system is to be used to boot respective computers. Because of such characteristics, in a system providing service by geographically concentrating a large number of server computers, the network boot is considered a favorable technique for so-called deployment in which a new server is added to improve response to requests when the load of each server rises due to an unexpected increase in requests.

However, although the network boot has these kinds of advantages, the network boot requires longer time to read programs because the programs are loaded from the server through the network. Thus, one problem is that the time required for booting is long in comparison to a conventional booting method which loads programs from a local HDD. Therefore, technology which speeds up booting of a computer system by the network boot is important.

As a conventional high-speed booting method for computers which does not rely on the network boot, a technique is known that uses a boot-up main memory image. This method performs booting by utilizing the fact that as long as the settings and configuration of the hardware, OS and application programs are not changed, the same operations are performed each time in which system initialization processing is carried out, and thus the state of the contents of the main memory immediately after boot-up is roughly the same each time. Therefore, in this method, the boot-up main memory image is stored in a local storage and loaded in that state to be written into the main memory at boot-up.

One example of this kind of high-speed booting method is disclosed in Patent Document 1. In the method disclosed in this document, a backup memory or a disk file is provided for backup, and the boot-up main memory image is stored in the memory or the disk file. At the time of booting and rebooting, memory copying is carried out consecutively from the memory or the disk file to the main memory, and as soon as copying of the boot-up main memory image onto the main memory is completed the system can operate. The Patent Document 1 also contains a description regarding a method for generating the boot-up main memory image.

[Non-Patent Document 1] Hal Stern, "NFS & NIS", ASCII Corporation, Dec. 1, 1992, pp. 219-232.

[Patent Document 1] Japanese Patent No. 2772103 (Japanese Patent Laid-Open No. 03-278126)

BRIEF SUMMARY OF THE INVENTION

As described above, although a network boot offers various advantages, one problem is that high-speed booting cannot be performed with conventional computers using the network boot. The reason is that the booting time of a conventional computer using the network boot is the sum total of a) the time required for initialization of the hardware, b) the time required to load programs via a network, and c) the time required for initialization processing described in the programs.

By applying the aforementioned technique using a boot-up main memory image that is described in Patent Document 1 to boot a computer by the network boot, the booting time can be reduced by the time c). However, when network throughput is low, a proportion of the booting time that is occupied by the time b) increases. Therefore, even by applying a technique which uses a boot-up main memory image to reduce the booting time by the time c), a rate of reduction of the booting time is not improved very much.

The present invention has been proposed in view of the foregoing circumstances. An object of this invention is to enable the booting time of a computer that is booted using a network boot method to be adequately reduced.

According to one aspect of this invention there is provided a computer, wherein the computer loads an initial load image through a network from a server which manages a boot-up main memory image of an OS and application programs as well as the initial load image that is one part of the main memory image. The computer then writes the initial load image into the main memory and boots a system using the initial load image. After the start of operation of the system, when a first access occurs to a remaining part of the main memory image which is other than the initial load image, for each region of a predetermined width, the computer loads a main memory image from the server and writes the main memory image into the main memory.

According to another aspect of this invention, there is provided a computer which consists of a main memory, a network interface and a data processing unit. The network interface is connected through a network to a server which manages a boot-up main memory image of an OS and application programs as well as an initial load image which is one part of the main memory image. The data processing unit comprises: means which writes into the main memory the initial load image which is loaded from the server by the network interface through a network; means which carries out booting of a system using the initial load image; means which detects, for each main memory image of a predetermined width, that a first access occurs with respect to a remaining part of the main memory image which is other than the initial load image after the start of operation of the system; and means which loads a main memory image of a predetermined width for which the first access is detected from the server using the network interface through a network and writes it into the main memory.

According to a further aspect of this invention, there is provided a computer which consists of a main memory, a network interface and a data processing unit. The network interface is connected through a network to a server which manages a boot-up main memory image of an OS and application programs as well as an initial load image which is one part of the main memory image. The data processing unit comprises: means which loads an initial load image which is one part of the main memory image from the server using the network interface through a network and writes the initial load image into the main memory; means which boots a system using the written initial load image; means which generates an exception upon detecting, for each main memory image of a predetermined width, that a first access occurs with respect to a remaining part of the main memory image which is other than the initial load image after the start of operation of the system; and means which loads the main memory image of a predetermined width for which the exception is generated from the server through the network using the network interface and writes the main memory image into the main memory.

According to a further aspect of this invention, there is provided a computer which consists of a main memory, a network interface and a data processing unit. The network interface is connected through a network to a server which manages a boot-up main memory image of an OS and application programs as well as an initial load image which is one part of the main memory image. The data processing unit comprises: means which loads the initial load image from the server using the network interface through the network and writes the initial load image into the main memory; means which boots a system using the initial load image; a page table which stores a protection mode and mapping information of logical block addresses and physical block addresses of the system, and in which a predetermined protection mode which is unrelated to an original protection attribute is initialized for blocks belonging to a main memory image part other than the initial load image, wherein the table is included in the initial load image; a protection information unit which stores location attributes indicating whether or not the original protection attribute of each logical block of the system and a physical block corresponding to the logical block are present on the server, wherein the information is included in the initial load image; means which refers to the page table and translates a logical address included in a memory access request into a physical address, wherein the means generates an exception when a protection mode of the access destination is the predetermined protection mode; and means which judges from the protection information unit a location attribute of a block of the logical address for which the exception is generated, and when the location attribute indicates that the physical block is present on the server, the means loads a main memory image of the physical block from the server through the network using the network interface to write the main memory image into the main memory, and changes a protection mode corresponding to the block of the logical address for which the exception is generated in the page table to the original protection attribute which is set in the protection information unit.

According to a still further aspect of this invention, there is provided a computer which consists of a main memory, a network interface and a data processing unit. The network interface is connected through a network to a server which manages a boot-up main memory image of an OS and application programs as well as an initial load image which is one part of the main memory image. The data processing unit comprises: means which loads the initial load image from the server through the network using the network interface to write the initial load image into the main memory; means which boots a system using the initial load image; a status table which stores sets of a physical block of the system and a status indicating whether or not that physical block has been loaded, wherein at the time of system booting the status is initialized to a non-loaded state; a protection information unit which stores location attributes showing whether or not the respective physical blocks of the system are present on the server; and a memory access unit which accesses the main memory in accordance with a memory access request, wherein when a location attribute of a physical block of an access destination is set in a non-loaded state in the status table and the location attribute of that physical block is indicated as being present on the server by the protection information unit, the memory access unit loads a main memory image of that physical block from the server through the network using the network interface and writes it into the main memory, and changes the status in the status table to loaded.

According to another aspect of this invention, there is provided a method for booting a computer, wherein an initial load image is loaded via a network and written in a main memory of a computer from a server which manages a boot-up main memory image of an OS and application programs as well as the initial load image which is one part of the main memory image. A system of the computer is then booted using the initial load image. After the start of operation of the system, when a first access occurs to a remaining part of the main memory image which is other than the initial load image, for each region of a predetermined width, a main memory image is loaded from the server and written into the main memory of the computer.

According to a further aspect of this invention, there is provided a method for booting a computer, wherein a network interface of a computer consisting of a main memory, a network interface and a data processing unit connects through a network to a server which manages a boot-up main memory image of an OS and application programs as well as an initial load image which is one part of the main memory image. The data processing unit loads the initial load image from the server through a network using the network interface and writes the initial load image into a main memory. The data processing unit then boots a system using the initial load image. After the start of operation of the system, the data processing unit detects, for each main memory image of a predetermined width, that a first access occurs with respect to a remaining part of the main memory image which is other than the initial load image, and loads the main memory image of a predetermined width for which the first access is detected from the server through the network using the network interface and writes the main memory image into the main memory.

According to a further aspect of this invention, there is provided a method for booting a computer, wherein a network interface of a computer consisting of a main memory, a network interface and a data processing unit connects through a network to a server which manages a boot-up main memory image of an OS and application programs as well as an initial load image which is one part of the main memory image. The data processing unit loads the initial load image from the server through the network using the network interface and writes the initial load image into the main memory. The data processing unit then boots a system using the initial load image. After the start of operation of the system, the data processing unit generates an exception upon detecting, for each main memory image of a predetermined width, that a first access occurs with respect to a remaining part of the main memory image which is other than the initial load image, and loads the main memory image of a predetermined width for which the exception is generated from the server through the network using the network interface and writes the main memory image into the main memory.

According to a still further aspect of this invention, there is provided a method for booting a computer, wherein a network interface of a computer consisting of a main memory, a network interface and a data processing unit connects through a network to a server which manages a boot-up main memory image of an OS and application programs as well as an initial load image which is one part of the main memory image. The data processing unit is means which; loads the initial load image from the server through the network using the network interface and writes the initial load image into the main memory; boots a system using the initial load image; refers to a page table which stores a protection mode and mapping information of logical block addresses and physical block addresses of the system, in which a predetermined protection mode which is unrelated to an original protection attribute is initialized for blocks belonging to a main memory image part which is other than the initial load image; and translates a logical address included in a memory access request into a physical address. The data processing unit generates an exception when a protection mode of the access destination is the predetermined protection mode, and determines a location attribute of a block of the logical address for which the exception is generated from a protection information unit which stores location attributes showing whether or not the original protection attribute of each logical block of the system and a physical block corresponding to the logical block are present on the server. When the location attribute indicates that the physical block is present on the server, the data processing unit loads a main memory image of the physical block from the server through the network using the network interface to write the main memory image into the main memory of the computer. It also changes a protection mode corresponding to the block of the logical address for which the exception is generated in the page table to the original protection attribute set in the protection information unit.

According to a further aspect of this invention, there is provided a method for booting a computer, wherein a network interface of a computer consisting of a main memory, a network interface and a data processing unit connects through a network to a server which manages a boot-up main memory image of an OS and application programs as well as an initial load image which is one part of the main memory image. The data processing unit loads the initial load image from the server through the network using the network interface and writes the initial load image into the main memory. The data processing unit then boots a system using the written initial load image. A memory access unit accesses the main memory in accordance with a memory access request using a status table which stores sets of a physical block of the system and a status showing whether or not that physical block has been loaded, wherein at system boot time the status is initialized to a non-loaded state, and a protection information unit which stores location attributes showing whether or not each physical block of the system is present on the server. When a location attribute of a physical block of an access destination is set in a non-loaded state in the status table and the location attribute of that physical block is indicated as present on a server by the protection information unit, the memory access unit loads a main memory image of that physical block from the server through the network using the network interface and writes it into the main memory. The memory access unit then changes the status in the status table to a loaded state.

According to a further aspect of this invention, there is provided a server that comprises: a memory which stores a boot-up main memory image of an OS and application programs of a computer as well as an initial load image which is one part of the main memory image; a network interface which communicates with the computer through a network; and control means. Upon receiving a load request for the initial load image from the computer, the control means reads out the initial load image from the memory and sends it to the computer which is the request source through a network using the network interface. Upon receiving a load request from the computer for a remaining part of a main memory image which is other than the initial load image, the control means reads out the requested main memory image of a predetermined size from the memory and sends it to the computer through the network using the network interface.

According to a still further aspect of this invention, there is provided a server according to the first server, comprising an image location table having flags showing, for each region of a predetermined width of the boot-up main memory image, whether or not the region belongs to the initial load image, wherein the control means refers to the image location table to determine the initial load image.

Here, the initial load image includes at least the minimum operating system text and data which are required to boot a system as well as programs and data which are necessary for the computer to load a block belonging to a main memory image part other than the initial load image in an on-demand manner from the server.

BRIEF DESCRIPTION OF THE DRAWINGS

FIG. 4 is a flowchart showing an example of processing of a controller of the server in the first embodiment of this invention;

FIG. 10 is a view showing an example of contents of an image location table which is comprised by the server in one example of the first embodiment of this invention;

FIG. 11 is a view showing an example of contents of a protection information unit in one example of the first embodiment of this invention;

FIGS. 12A and 12B are, respectively, a view showing an initial state and a state after a change in the page table in one example of the first embodiment of this invention;

FIG. 20 is a view showing an example of contents of an image location table that is comprised by a server in the second embodiment of this invention;

FIG. 21 is a view showing an example of contents of a protection information unit in one example of the second embodiment of this invention;

DETAILED DESCRIPTION OF THE PREFERRED EMBODIMENTS

First Embodiment

Figure 1:
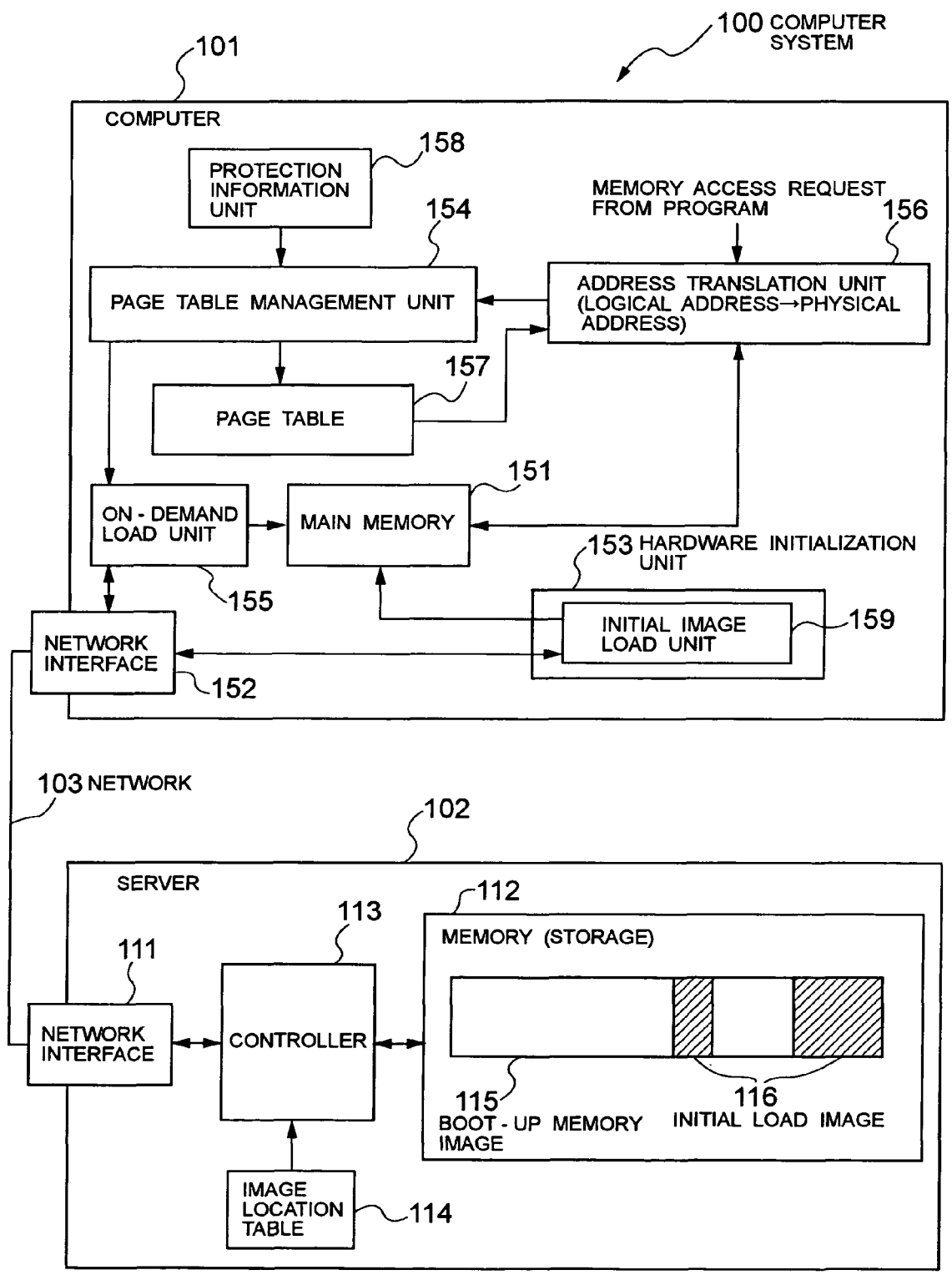
FIG. 1 is a block diagram of a computer system according to a first embodiment of this invention.

Referring to FIG. 1, a computer system 100 of the first embodiment of this invention is composed of a computer 101 and a server 102. The computer 101 and the server 102 communicate with each other through a network 103. In this embodiment, although a configuration is illustrated in which the server 102 and the computer 101 respectively comprise one unit, the server or the computer is not limited to one unit and a configuration may be employed that comprises a plurality of servers and/or computers.

When the server 102 and the computer 101 are connected one-to-one, a communication line such as a serial line, a parallel line or Ethernet (registered trademark) can be used for the network 103. When either the server 102 or the computer 101, or both of these, comprises a plurality of servers or computers, Ethernet can be used. Further, TCP/IP can be used as a communication protocol. However, a communication line and a communication protocol are not limited to these, and an arbitrary communication line and communication protocol can be used.

The server 102 has a network interface 111 for communicating with the computer 101, a memory (storage) 112, a controller 113 and an image location table 114.

The memory 112 of the server 102 stores a main memory image (hereunder, referred to as "boot-up memory image") 115 that is a memory image of a state after initialization processing of an OS and application programs operating on the computer 101. An arbitrary method can be used as a method to generate the boot-up memory image 115. For example, the image can be generated by dumping a main memory image directly after booting the computer 101 by a conventional method for booting a system. The shaded parts in the boot-up memory image 115 represent an initial load image 116, which is sent in one batch to the computer 101 at the time of network boot of the computer 101. The initial load image 116 includes at least the minimum OS text and data which are required to boot the system of the computer 101 as well as programs and data necessary for the computer 101 to load blocks belonging to the boot-up memory image 115 other than the initial load image 116 in an on-demand manner from the server 102. The memory 112 is composed of, for example, a random access storage medium such as a HDD or a semiconductor memory (DRAM or SRAM, etc.). When there is no necessity to rewrite the main memory image, a ROM or the like may also be used.

Figure 2:
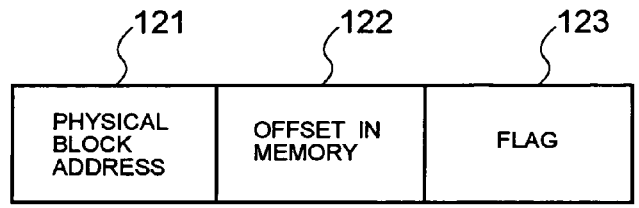
FIG. 2 is a view showing an example of a configuration of an entry of an image location table comprised by a server in the first embodiment of this invention.

The image location table 114 of the server 102 is a table which manages the boot-up memory image 115. FIG. 2 shows an example of a configuration of an entry of the image location table 114. The image location table 114 is composed of a group of entries shown in FIG. 2. One entry corresponds to one block of the boot-up memory image 115. One block represents one physical block in the physical address space of the computer 101. Referring to FIG. 2, one entry comprises a physical block address 121 of the block in question, an offset in memory 122 of the memory 112 in which the block is stored, and a flag 123. The flag 123 is set to the value 1 when the block belongs to the initial load image 116, and is set to the value 0 if the block does not belong to the initial load image 116.

The controller 113 of the server 102 sends the initial load image 116 in the boot-up memory image 115 and boot-up memory image parts other than the initial load image 116 to the computer 101 which is the source of the request, in response to a request received from the computer 101.

Figure 3A:
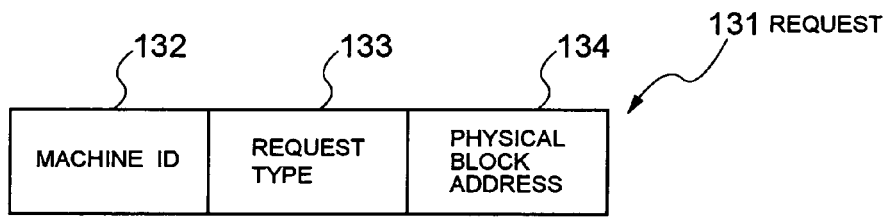
FIGS. 3A and 3B are, respectively, a view showing forms of a request and a reply that are exchanged between a computer and a server in the first embodiment of this invention.
Figure 3B:
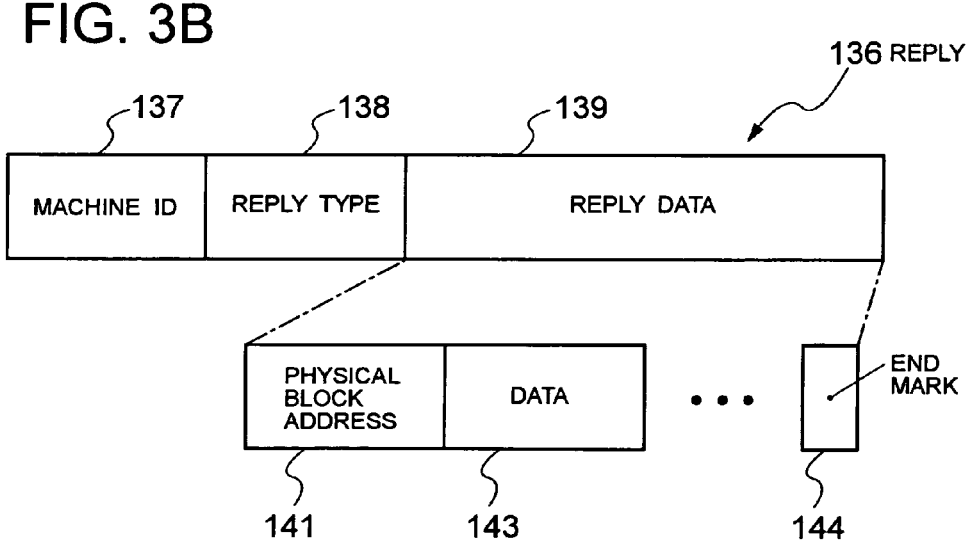

FIGS. 3A and 3B show examples of a form of a request from the computer 101 and a form of a reply from the server 102, respectively. Referring to FIG. 3A, the request 131 sent from the computer 101 to the server 102 includes a machine ID 132, a request type 133 and a physical block address 134. The machine ID 132 is an identifier which uniquely identifies the system booted by the computer 101 or is an identifier which uniquely identifies the computer 101. In the latter case, an IP address assigned to the computer 101 or a MAC address of the network interface 152 or the like can be used as the machine ID 132. The request type 133 is an item which specifies whether the request is for the initial load image 116 or for a part of the boot-up memory image 115 other than the initial load image 116. A request for the part of the boot-up memory image 115 other than the initial load image 116 is performed for one physical block. Following the request type 133, the address 134 of the requested physical block is specified.

Referring to FIG. 3B, the reply 136 sent from the server 102 to the computer 101 includes a machine ID 137, a reply type 138 and a reply data 139. The machine ID 137 is the same as the machine ID 132 in the request 131. The reply type 138 is an item which specifies whether the reply is to a request for the initial load image 116 or to a request for the boot-up memory image 115 other than the initial load image 116. When the reply is to a request for the initial load image 116, the reply data 139 includes a physical block address 141 and a data 143 of the physical block in question for all of the physical blocks belonging to the initial load image 116, respectively, and finally includes a predetermined end mark 144 indicating the end of the reply. When the reply is to a request for a part of the boot-up memory image 115 other than the initial load image 116, for one requested physical block, the reply data 139 includes the physical block address 141 and the data 143 of the physical block in question.

FIG. 4 shows an example of processing of the controller 113 of the server 102. When the controller 113 receives using the network interface 111 the request 131 sent from the computer 101 (S101), it analyzes the request type 133 in the request 131 and determines whether the request is for the initial load image 116 or the boot-up memory image 115 other than the initial load image 116 (S102). When the initial load image 116 has been requested, the controller 113 retrieves from the image location table 114 all entries for which the value of the flag 123 is 1 (S103). The controller 113 focuses attention on one entry among these entries (S104), and based on the offset in memory 122 of the entry under attention the controller 113 reads out data of the size of a single block from the memory 112 as the data of one physical block. The controller 113 then accumulates in a reply data buffer (not shown in the figure) the physical block address 121 of the entry under attention and the aforementioned physical block data which was read out (S106). Thereafter, the controller 113 shifts attention to the next entry (S107), and repeats the processing of steps S105 and S106. When processing has been completed for all of the entries (YES in S108), the end mark 144 is attached to the end of the reply data buffer and the reply 136 is generated in which the machine ID 137 and the reply type 138 are added to the reply data 139 accumulated in the reply data buffer. The reply 136 is then sent to the computer 101 which is the source of the request through the network interface 111 (S109).

When the request type 133 of the request 131 is a request pertaining to the physical block address 134, that is, a request to load a part of the boot-up memory image 115 other than the initial load image 116 in a unit of one physical block, the controller 113 retrieves an entry having the physical block address 121 which is the same as the physical block address 134 of the request 131 from the image location table 114 (S110). Next, based on the offset in memory 122 of the retrieved entry, the controller 113 reads out data of the size of one block from the memory 112 as the data of one physical block (S111). The controller 113 then accumulates in the reply data buffer (not shown in the figure) the physical block address 121 of the retrieved entry and the aforementioned physical block data which was read out (S112). Thereafter, the reply 136 is generated in which the machine ID 137 and the reply type 138 are added to the reply data 139 which was accumulated in the reply data buffer. The reply 136 is then sent to the computer 101 which is the source of the request through the network interface 111 (S109).

The computer 101 comprises a main memory 151, a network interface 152, a hardware initialization unit 153, a page table management unit 154, an on-demand load unit 155, an address translation unit 156, a page table 157 and a protection information unit 158. Here, the elements other than the main memory 151 and the network interface 152 constitute a data processor.

The main memory 151 may be any kind of memory as long as it is a random access semiconductor memory, and generally a DRAM or SRAM or the like is used.

The page table 157 is a control table which stores information for translating a memory address (logical address) which is specified virtually by an OS or an application program (both of these are collectively referred to as "program") operating on the computer 101 into a memory address (physical address) which is actually allocated in the main memory 151, as well as a protection mode. The logical address is composed of a logical block address and an internal block address, while the physical address is composed of a physical block address and the internal block address.

Figure 5:
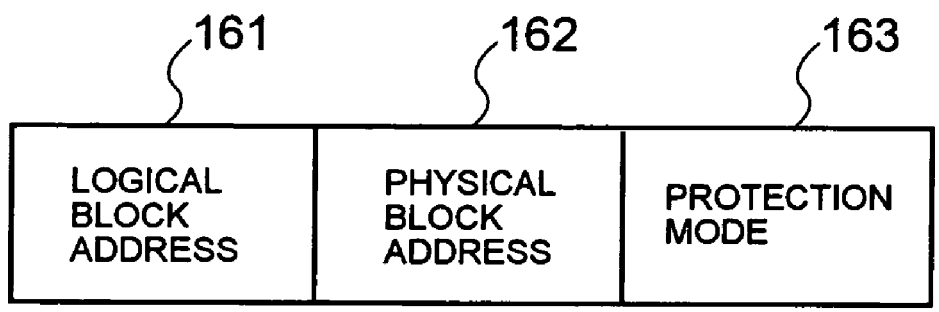
FIG. 5 is a view showing an example of a configuration of an entry of a page table comprised by the computer in the first embodiment of this invention.

FIG. 5 shows an example of a configuration of an entry of the page table 157. The page table 157 is composed of a group of entries shown in FIG. 5. Referring to FIG. 5, one entry comprises a logical block address 161, a physical block address 162 and a protection mode 163. The logical block address 161 is an address which uniquely identifies individual logical blocks which are generated when the logical address space is divided into blocks of a predetermined size. The physical block address 162 is an address which uniquely identifies individual physical blocks which are generated when the physical address space is divided into blocks of the same size as those of the logical address space. Although the use of a specific unit of architecture called a "page" as a block enables efficient processing, this invention is not limited to that unit. The protection mode 163 may be a read-only protection mode, a read/write protection mode, or a NULL protection mode. When the protection mode 163 is NULL, it indicates that the physical block defined by the physical block address 162 of that entry has not been assigned yet with respect to the logical block defined by the logical block address 161 of the entry. When the protection mode 163 is the read-only or read/write protection mode, it indicates that the physical block defined by the physical block address 162 of that entry has been assigned with respect to the logical block defined by the logical block address 161 of the entry, and that the physical block is enable to be read-only or to be read and written.

Figure 6:
FIG. 6 is a view showing an example of a configuration of an entry of a protection information unit comprised by the computer in the first embodiment of this invention.

The protection information unit 158 is a control table which stores protection attributes of programs executed by the computer 101. FIG. 6 shows an example of a configuration of an entry of the protection information unit 158. The protection information unit 158 is composed of a group of entries shown in FIG. 6. Referring to FIG. 6, one entry comprises a set of a logical block address 171, a protection attribute 172, and a location attribute 173. The protection attribute 172 may be a read-only protection attribute or a read/write protection attribute. Which of these protection attributes is set is decided according to the original protection attribute of the block specified by the logical block address 171. In the location attribute 173, either a "server" or "local" location attribute is set. When the location attribute 173 is "server", it indicates that contents of the block in question have to be loaded from the server 102. When the location attribute 173 is "local", it indicates that the data of the block in question is not on the server 102 and that the computer 101 can allocate an arbitrary physical block.

The hardware initialization unit 153 is a unit which performs initialization of each part of the hardwares when the computer 101 is booted. The hardware initialization unit 153 comprises an initial image load unit 159.

The initial image load unit 159 and the on-demand load unit 155 are parts which load the boot-up memory image 115 by sending a request in the form shown in FIG. 3A to the server 102 through the network interface 152. The initial image load unit 159 performs loading the initial load image 116 in the boot-up memory image 115 after initialization of the various parts of the hardwares by the hardware initialization unit 153. The on-demand load unit 155 performs loading in an on-demand manner every one physical block of the boot-up memory image 115 other than the initial load image 116 after the system has started to be in operation. Each physical block of the boot-up memory image 115 loaded from the server 102 is written into the main memory 151 based on the physical block address 141 of the form shown in FIG. 3B. More specifically, when the reply type 138 indicates a reply to a request for the initial load image 116, every each time the initial image load unit 159 receives a set of the physical block address 141 and the data 143, it writes the data 143 in a region which is the size of a single block of the main memory 151, based on the physical block address 141, until it receives the end mark 144. When the reply type 138 indicates a reply to a request for the boot-up memory image 115 which is other than the initial load image 116, since the on-demand load unit 155 receives only one set of the physical block address 141 and data 143, it writes that data 143 in a region which is the size of a single block of the main memory 151, based on the physical block address 141.

The address translation unit 156 has a function which translates logical addresses specified by programs operating on the computer 101 at the time of a memory operation into physical addresses. It also has a function that detects exceptions caused by protection mode violations and activates exception handling. Translation from the logical address into the physical address and detection of exceptions caused by protection mode violations are performed by referring to the page table 157. The page table management unit 154 has a function which executes exception handling activated by the address translation unit 156. The processing in exception handling includes: determining the original protection attribute by referring to the protection information unit 158; loading contents of the non-loaded blocks from the server 102 through the network interface 152 using the on-demand load unit 155 and writing the contents of the blocks into the main memory 151; and updating of the page table 157.

Figure 7:
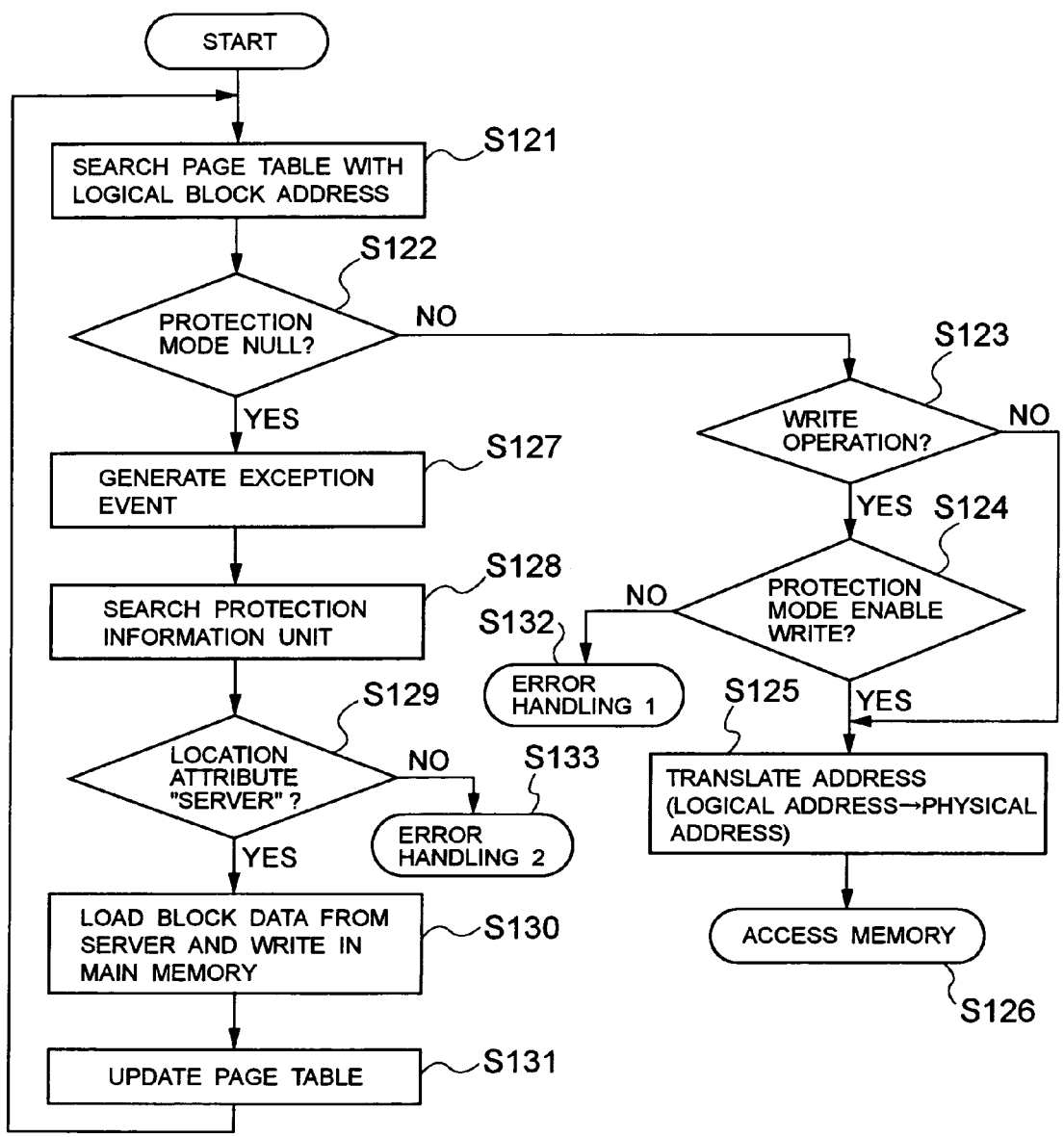
FIG. 7 is a flowchart showing an example of processing of an address translation unit and a page table management unit of the computer in the first embodiment of this invention.

FIG. 7 shows an example of processing of the address translation unit 156 and the page table management unit 154. When a memory access occurs, the address translation unit 156 searches the page table 157 using the block address in the logical address relating to the memory access specified by a program, and loads an entry which corresponds with the logical block address 161 shown in FIG. 5 (step S121). The address translation unit 156 judges whether the protection mode 163 in the entry loaded in step S121 is NULL, read-only, or read/write (step S122). If the protection mode is read-only or read/write (NO in step S122), the address translation unit 156 checks the access mode with the protection mode to verify whether or not the access is a valid access (steps S123 and S124). When it is an invalid access, an error handling 1 such as rejection of the memory access is carried out (step S132). When it is a valid access, using the physical block address 162 in the entry loaded in step S121, the address translation unit 156 translates the logical address specified by the program into a physical address (step S125) and accesses the location in the main memory 151 designated by that physical address (step S126).

When the protection mode 163 is NULL (YES in step S122), the address translation unit 156 temporarily suspends handling of the memory access in question, and notifies the page table management unit 154 of an exception event to activate exception handling (step S127). In the exception event, the logical block address 161 and the physical block address 162 in the entry loaded in step S121 are notified to the page table management unit 154.

The page table management unit 154 searches the protection information unit 158 using the notified logical block address 161, and loads the protection attribute 172 and the location attribute 173 of the entry corresponding with the logical block address 171 of FIG. 6 (step S128). Next, the page table management unit 154 judges whether the location attribute 173 is "local" or "server" (step S129). If the location attribute 173 is "local" (NO in step S129), the page table management unit 154 notifies an error to the address translation unit 156, whereby the address translation unit 156 performs an error handling 2 such as rejection of the suspended memory access (step S133). Normally, an OS which carries out on-demand memory allocation is mainly used in this case, and processing such as allocation of physical memory or the like is carried out in OS processing following the error handling 2.

When the location attribute 173 is "server" (YES in step S129), the non-loaded block specified by the physical block address 162 notified from the address translation unit 156 is loaded from the server 102 and written in the main memory 151 (step S130) by the on-demand load unit 155. The write address of the main memory 151 to which the loaded block is written is the physical block address 162 notified from the address translation unit 156.

Next, the page table management unit 154 retrieves from the page table 157 an entry for which the logical block address 161 of FIG. 5 corresponds with the logical block address notified from the address translation unit 156. The page table management unit 154 updates the protection mode 163 of that entry by the value of the protection attribute 172 retrieved in step S128 (step S131). The page table management unit 154 then notifies the translation unit 156 that the exception handling is completed.

When the address translation unit 156 receives the notification of completion of exception handling from the page table management unit 154, it restarts from step S121 the processing of the memory access which had been temporarily suspended.

Figure 8:
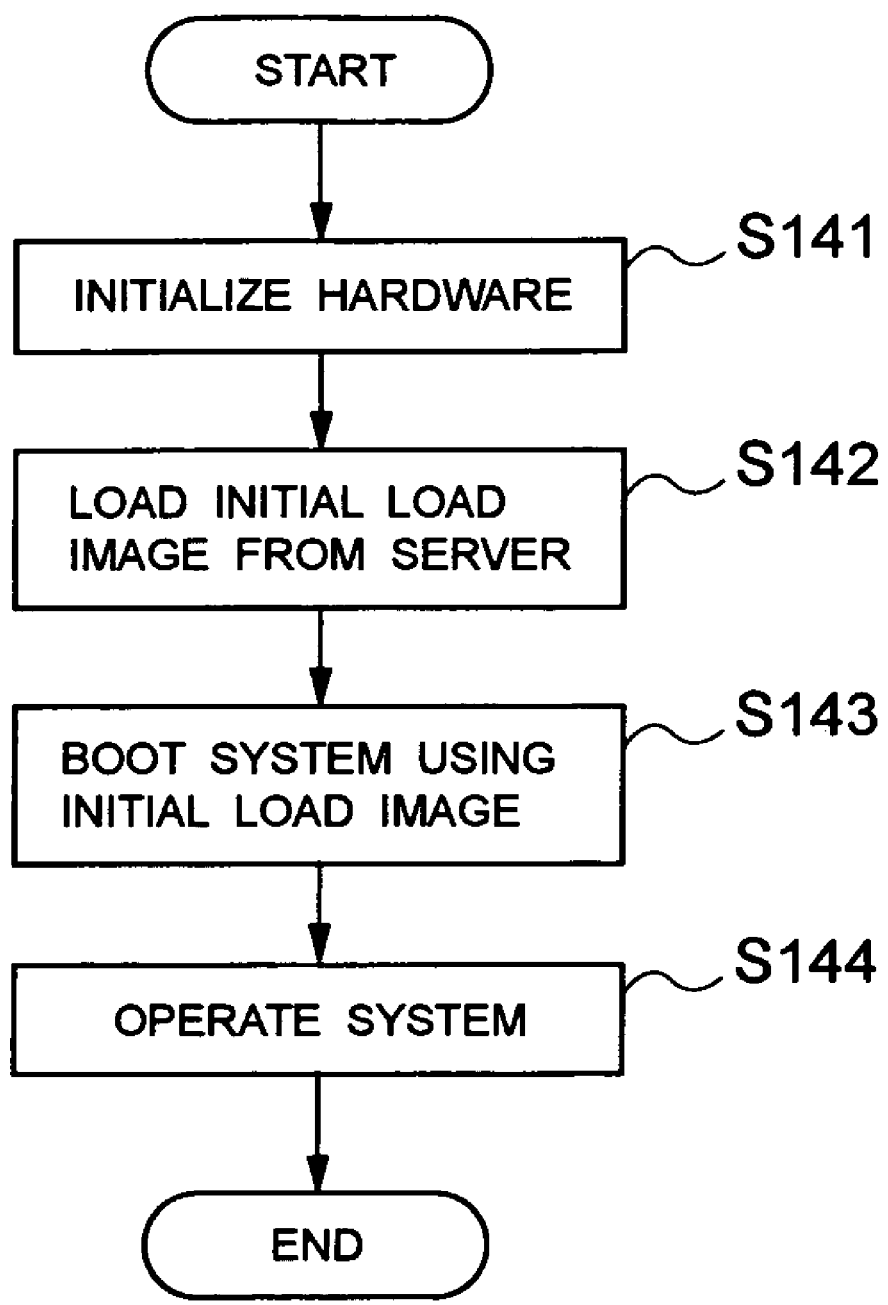
FIG. 8 is a flowchart showing an outline of operations of the first embodiment of this invention.

FIG. 8 is a flowchart showing an outline of the operations of the computer 101. Hereunder, the operations of this embodiment are described referring to the figures.

When the computer 101 is booted, as shown in FIG. 8, first, the initialization of hardware is performed by the hardware initialization unit 153 (step S141). Next, the computer 101 loads the initial load image 116 from the server 102 by sending the request 131 including the machine ID 132 and request type 133 which requests loading of the initial load image of FIG. 3A to the server 102 through the network interface 152 using the initial image load unit 159. The computer 101 writes the initial load image 116 into the main memory 151 (step S142). For this embodiment, the page table 157 and the protection information unit 158 are included in the initial load image 116 in an initialized state.

In the initialized page table 157, the setting is completed for the logical block address 161 and the physical block address 162 in all entries of the same kind as that shown in FIG. 5. Regarding the protection mode 163 in all of the aforementioned entries, in each entry of blocks belonging to the initial load image 116 the protection mode 163 is set to the original protection attribute (read-only or read/write) of the block, and for each entry of blocks belonging to the boot-up memory image 115 other than the initial load image 116 the protection mode 163 is set to NULL.

In the initialized protection information unit 158, in all entries of the same kind as that shown in FIG. 6, the setting is completed for the logical block address 171 and the protection attribute 172. Further, the location attribute 173 is set to "server" in each entry of blocks belonging to the boot-up memory image 115 and set to "local" in each entry of blocks which are allocated in an on-demand manner on the computer 101 side.

Next, the computer 101 boots the system using the initial load image 116 loaded from the server 102 and written on the main memory 151 (step S143). Because this initial load image 116 is the same state as the state immediately after booting the OS and application programs, the system returns to the environment which exists immediately after boot-up. At this time, there is no state in which operation is suspended from the time of boot-up using the initial load image 116 until system operation (step S144) is enabled.

In the system operation stage (step S144), when a first access occurs from a program to a non-loaded block, since that block is mapped with a NULL protection mode, the address translation unit 156 notifies an exception event and temporarily suspends the access in question (S127 in FIG. 7). The page table management unit 154 which received the exception event refers to the protection information unit 158 to judge the location attribute of the block of the accessed logical address (step S128 of FIG. 7). If the location attribute is "server", the page table management unit 154 loads the data of the block in question from the server 102 and writes the contents into the main memory 151 (step S130 of FIG. 7). The page table management unit 154 also sets the physical block in question in the page table 157 so that the protection mode of the original protection attribute is mapped in the logical block address to which access occurred, and then restarts processing of the access temporarily suspended (step S131 of FIG. 7). As a result, the access temporarily suspended and subsequent accesses to the block in question are executed to the allocated main memory block. At this time, by making the block units small, it is possible to reduce the load time from the server 102 and to reduce the time in which system operation is suspended.

Next, the initial load image 116 is described in further detail.

In this embodiment, the system of the computer 101 is booted using only the initial load image 116. Accordingly, the initial load image 116 must include the minimum OS text and data required to boot the system of the computer 101. Conversely, application programs or text and data for implementing additional functions of the OS without which system booting can still be performed without trouble, may not be included in the initial load image 116.

As is clear from the foregoing descriptions, unless the programs and data for implementing the processing of FIG. 7 are present on the computer 101, processing will not be maintained after the system is booted. Therefore, it is necessary that the initial load image 116 includes at least OS exception handlers beginning with the page table management unit 154, a program which implements the on-demand load unit 155, the page table 157, the protection information unit 158 and a control driver for the network interface 152. In this connection, if the control driver for the network interface 152 which is used when the initial image load unit 159 loads the initial load image 116 from the server 102 through the network interface 152 can be utilized as it is, it is not necessary to include it in the initial image load unit 159.

By employing the above-described minimum configuration as the initial load image 116, the system booting time can be minimized. However, even if the initial load image 116 of the minimum configuration is not employed, an effect of a certain degree can be obtained as long as the size of the initial load image 116 is smaller than that of the boot-up memory image 115. Accordingly, the configuration may be one in which, for example, all remaining blocks of the OS, some of the remaining blocks of the OS, or all daemons (resident programs) of the OS are further added to the block of the initial load image of the minimum configuration. The configuration may also be one in which blocks of application programs booted first are added to these configurations.

Next, this embodiment is described in further detail by means of an example.

Figure 9:
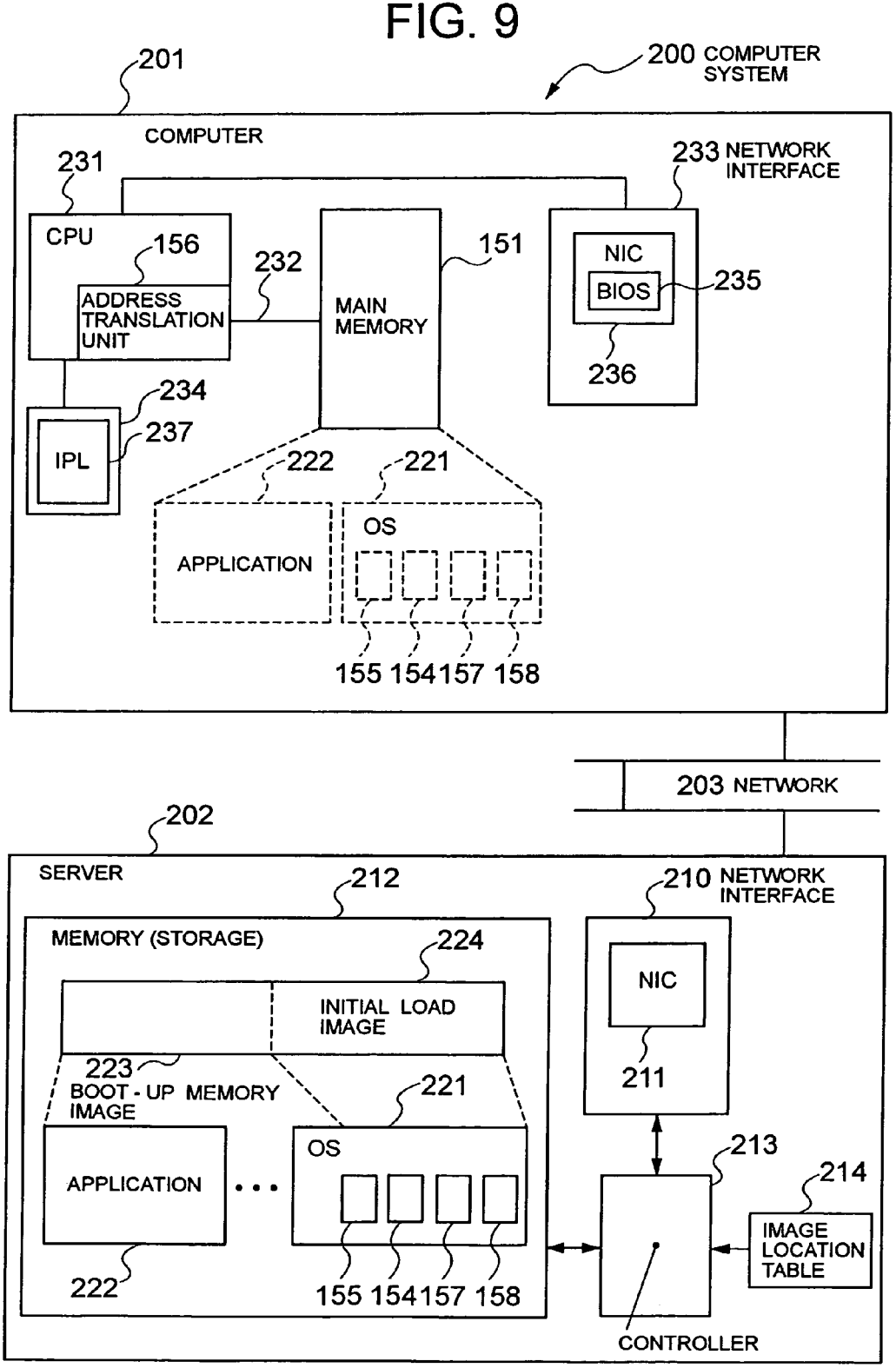
FIG. 9 is a block diagram of one example of the first embodiment of this invention.

A computer system 200 of FIG. 9 is an example of a computer system to which this embodiment was applied. The computer system 200 comprises a computer 201, a server 202, and a network 203. The network 203 connects the computer 201 and the server 202 to enable communication between these two elements.

A boot-up memory image 223 of a state after initialization processing of an OS 221 and an application program 222 is previously stored in a memory (storage) 212 of the server 202, and one part thereof constitutes an initial load image 224. The initial load image 224 includes the page table 157 and the protection information unit 158 of FIG. 1 in an initial state. The page table management unit 154 and the on-demand load unit 155 are also included as one function of the OS. A controller 213 comprises a CPU and a memory which stores programs operating on the CPU. The controller 213 is connected to the storage 212, an image location table 214 and a network interface 210. In the network interface 210 is provided an NIC (network interface card) for communicating with the computer 201.

In the computer 201, the main memory 151 is connected to a CPU 231 through a memory bus 232. The address translation unit 156 is housed in the CPU 231. A network interface 233 and a ROM (PROM) 234 are connected to the CPU 231. The network interface 233 is provided with a NIC 236 containing a BIOS 235. In this embodiment, the initial load image 224 is loaded from the server 202 using a function of the BIOS 235. More specifically, the BIOS 235 also fulfills the role of the initial image load unit 159 of FIG. 1. As an example of the BIOS 235 provided in the NIC 236, PXE (Preboot Execution Environment) manufactured by Intel Inc. and the like may be employed. An IPL 237 is also stored in the ROM (PROM) 234. In this embodiment, the function of the initial image loading means (BIOS 235) is contained in the NIC 263. However, when only a simple NIC control driver is provided in the BIOS 235 which is mounted on the NIC 236, a method is also available in which the initial image loading means is first loaded from an external server through the network using the control driver, and then an initial load image is loaded by executing the initial image loading means.

FIG. 10 shows an example of the contents of the image location table 214 of the server 202. To facilitate understanding of this invention, the number of blocks is extremely small in the example shown in the figure, and in practical application a large number of blocks are present. Referring to FIG. 10, the boot-up memory image 223 consists of 6 physical blocks. The size of the each of the physical blocks is assumed to be 4096 bytes. The physical block addresses of the physical blocks are 1 to 6, respectively. The physical blocks are respectively stored in regions 0x1000, 0x2000, ..., 0x6000 onwards in the memory 212. Of the 6 physical blocks, the flags of the 3 blocks with the physical block addresses 1, 2, 6 are set to the value 1. This indicates that these 3 blocks are the initial load image 224.

FIG. 11 shows an example of the contents of the protection information unit 158 of the OS 221. To facilitate understanding of this invention, the number of blocks is extremely small in the example shown in the figure, and in practical application a large number of blocks are present. Referring to FIG. 11, the protection attribute of the blocks of the logical block addresses 0 to 2, respectively, is read-only (R), and the protection attribute of the blocks of the logical block addresses 3 to 6, respectively, is read/write (RW). The location attribute of the blocks of the logical block addresses 0 to 5, respectively, is "server", while the location attribute for the logical block address 6 is "local".

FIG. 12A shows an example of an initial state of the page table 157 of the OS 221. To facilitate understanding of this invention, the number of blocks is extremely small in the example shown in the figure, and in practical application a large number of blocks are present. Referring to FIG. 12A, in the initial state of the page table 157 the physical block addresses 1 to 7 are mapped as reserved with respect to the logical block addresses 0 to 6. Referring to FIG. 12A and FIG. 10 together, of the 7 physical blocks having the physical block addresses 1 to 7, the 6 physical blocks having the physical block addresses 1 to 6 correspond to the boot-up memory image 223, and of these the 3 physical blocks having the physical block addresses 1, 2 and 6 are the initial load image 224. Therefore, in the protection mode of the respective physical blocks with the physical block addresses 1, 2 and 6, the original protection attribute is initialized. In contrast, although FIG. 11 shows that the original protection attributes are R and RW for the physical block addresses 3 to 5 belonging to the boot-up memory image 223 other than the initial load image 224, a NULL protection mode is initialized for these respective blocks in order to activate an exception handling by purposely causing a protection attribute violation when a first access occurs after starting operation. In this connection, the block of the logical block address 5 is a block included in the page table 157, and therefore read/write (RW) is set as the protection mode thereof.

Hereunder, the operation of the computer system 200 of this embodiment is described.

When the computer 201 is booted, in step S141 of FIG. 8, the main memory 151 is cleared and hardware such as the network interface 233 is initialized.

Next, in step S142 of FIG. 8, using the function of the BIOS 235 provided on the NIC 236, the initial load image 224 is loaded from the server 202 and written into the main memory 151. More specifically, the following operations are performed.

First, the MAC address of the NIC 236 is set for the machine ID 132 of FIG. 3A, and a request 131 in which the request type 133 is set to a type to instruct loading of the initial load image 224 is sent from the network interface 233 to the server 202 through the network 203. The communication address (MAC address) of the server 202 may, for example, be previously stored in the BIOS 235. The controller 213 of the server 202 receiving the request 131 through the network interface 210 refers to the image location table 214 of FIG. 10 and reads in order the 3 physical blocks for which the flag value is 1 from the starting addresses 0x1000, 0x2000 and 0x6000 of the memory 212. The controller 213 then generates a reply 136 of the form shown in FIG. 3B, and sends the reply 136 to the computer 201 through the network 203 using the network interface 210. In the reply 136, the MAC address of the NIC 236 is set for the machine ID 137, and a type which indicates that the reply is to a request for the initial load image 224 is set for the reply type 138. Further, regarding the physical block address 141 of the reply 136, 1 is set for the physical block read from the starting address 0x1000, 2 is set for the physical block read from the starting address 0x2000, and 6 is set for the physical block read from the starting address 0x6000. For each set of physical block address 141 and data 143 included in the received reply 136, the BIOS 235 of the computer 201 stores the data 143 of the set in question within the address range of the block size from the starting address of the main memory 151 which is specified by the physical block address 141 of that set.

At this time, since the initial load image 224 includes the initialized page table 157 and protection information unit 158, the state of the page table 157 is automatically set as shown in FIG. 12A on the computer 201. Further, the protection information unit 158 is set in the state shown in FIG. 11. Because the initial load image 224 also includes functions of the page table management unit 154 and the on-demand load unit 155, the utilization of these functions is also enabled.

Subsequently, in step S143 of FIG. 8, the CPU 231 boots the system using the initial load image 224 written into the main memory 151. More specifically, the IPL 237 sets the logical address of an instruction to be executed first when starting operation of the system in a program counter inside the CPU 231, and the system operation is started by commencing execution from that instruction.

Next, the operations carried out when programs executed on the CPU 231 access the main memory 151 in the system operation (step S144) stage will be described. As examples, the following types of access are assumed:

(1) a first write access to a logical address having a logical block address "3";

(2) second and subsequent write accesses to the logical address having the logical block address "3"; and (3) a read access to a logical address having a logical block address "1".

First, the operations at the time of a first write access to the logical address having the logical block address "3" are described. In this case, the address translation unit 156 searches the page table 157 using the logical block address "3", and loads the entry "logical block address 3, physical block address 4, and protection mode NULL" (step S121 of FIG. 7). At this time, since the protection mode is NULL (YES in step S122), the address translation unit 156 temporarily suspends processing of the memory access in question, and notifies the page table management unit 154 of an exception event to activate exception handling (step S127).

The page table management unit 154 searches the protection information unit 158 using the logical block address "3", and loads the entry having logical block address 3 with the location attribute "server" and the protection attribute RW (step S128).

Since the location attribute is "server" (YES in step S129), the on-demand load unit 155 loads the data of the block specified by the physical block address "4" which is present on the server 202 through the NIC 236, and writes it in the physical block address 4 on the main memory 151 (step S130). Next, the page table management unit 154 rewrites the protection mode of the entry having the logical block address "3" from NULL to RW (step S131), as shown in FIG. 12B. The page table management unit 154 then notifies the address translation unit 156 that the exception handling is completed.

When the address translation unit 156 receives notification of completion of exception handling from the page table management unit 154, it restarts processing of the memory access temporarily suspended from step S121. The address translation unit 156 searches the page table 157 using the logical block address "3". Since the page table 157 has been updated from the state in FIG. 12A to the state in FIG. 12B, this time the address translation unit 156 loads the entry of "logical block address 3, physical block address 4, protection mode RW" (step S121). Because the memory access specified from the program is a write access (YES in step S123) and the protection mode is RW (YES in step S124), the address translation unit 156 determines that there is no protection violation. Then, using the physical block address "4" of the loaded entry, the address translation unit 156 translates the logical address specified from the program into a physical address (step S125), and accesses the location in the main memory 151 designated by that physical address and writes in the data passed from the program (step S126).

Thus, after the start of system operation, when a first access occurs to a certain block for which the protection attribute is NULL, the data of that block is loaded from the server 202 and written in the main memory 151, and then up dating is performed. Although a write access is taken as an example in this case, the same applies for the case of a read access.

Next, the operations at the time of a second and subsequent write access to the logical address having the logical block address "3" are described. When the address translation unit 156 searches the page table 157 using the logical block address "3", since the page table 157 has been updated from the state in FIG. 12A to the state in FIG. 12B, the address translation unit 156 loads the entry of "logical block address 3, physical block address 4, protection mode RW" (step S121). Because the memory access specified from the program is a write access (YES in step S123) and the protection mode is RW (YES in step S124), using the physical block address "4" of the loaded entry, the address translation unit 156 translates the logical address specified from the program into a physical address (step S125). The address translation unit 156 then accesses the location in the main memory 151 which is designated by that physical address to write the data passed from the program (step S126).

Thus, after the start of system operation, when a second and subsequent access occurs to a block belonging to the boot-up memory image 223 which is other than the initial load image 224, since an operation to load data from the server 202 which took place for the first access is not necessary in this case, the data present on the main memory 151 is immediately updated. Although a write access is taken as an example in this case, the same applies for the case of a read access.

Next, the operations at the time of a read access to the logical address having the logical block address "1" are described. The address translation unit 156 searches the page table 157 using the logical block address "1" which is designated from a program, and loads the entry of "logical block address 1, physical block address 2, protection mode R" of FIG. 12B (step S121).

Next, since the memory access specified by the program is a read access (NO in step S123), using the physical block address "2" in the loaded entry, the address translation unit 156 translates the logical address specified from the program into a physical address (step S125). The address translation unit 156 then accesses the location in the main memory 151 which is designated by that physical address and returns the data read out to the program (step S126).

Thus, a read access to a block loaded as the initial load image 224 is executed by a main memory access without loading the block from the server 202 again. Although a read access is taken as an example in this case, the same applies for the case of an update access.

Modified Example 1 of First Embodiment

Although in the first embodiment the server 102 manages one kind of boot-up memory image 115, it is also possible to store a plurality of the boot-up memory image 115 which have respectively different contents in the memory 112 to be managed by the server 102. An example of the configuration of the server 102 in this case is shown in FIG. 13.

Figure 13:
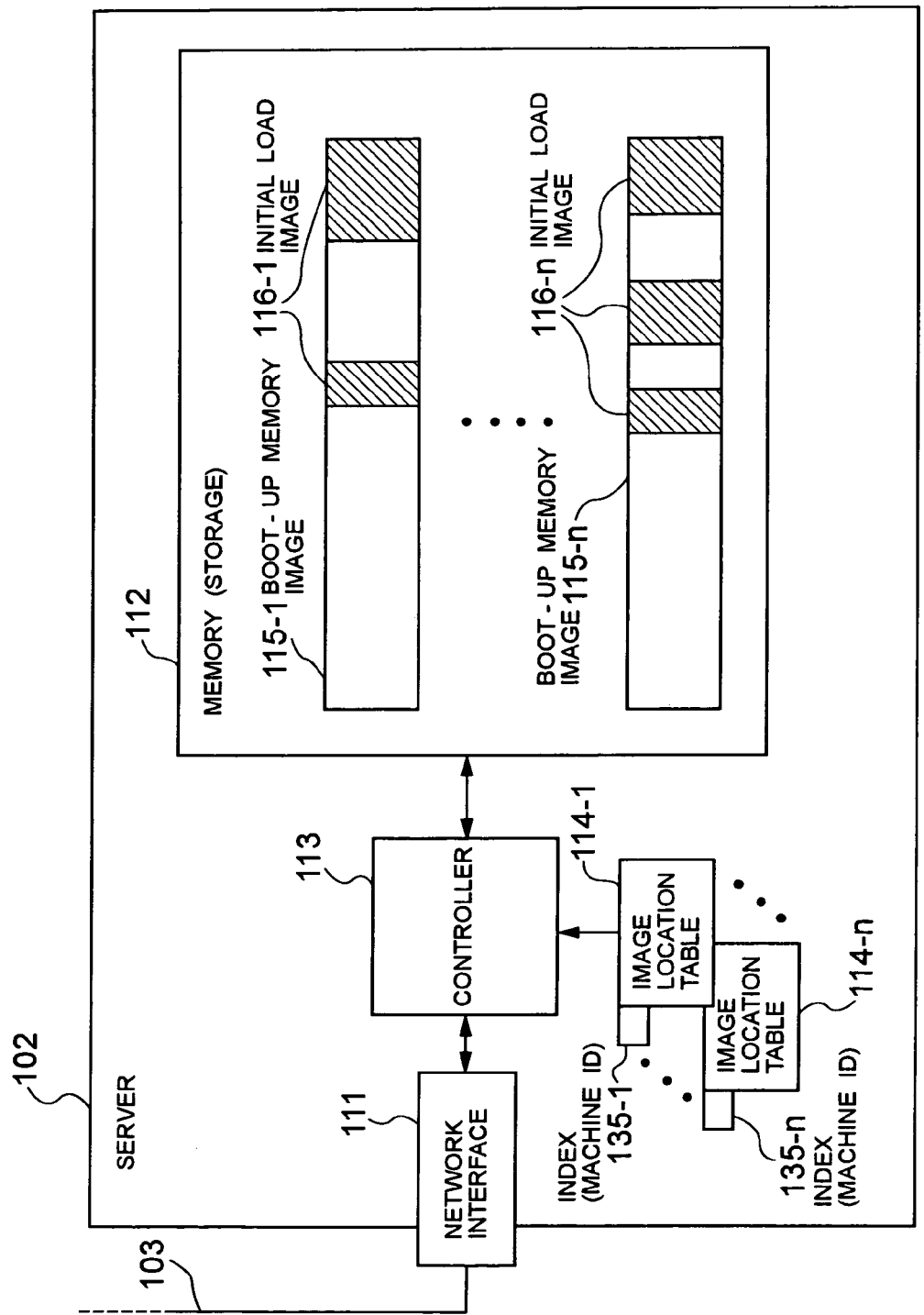
FIG. 13 is a block diagram showing an example of a configuration of a server in Modified Example 1 of the first embodiment of this invention.

Referring to FIG. 13, a plurality of boot-up memory images 115-1 to 115-*n* having respectively different contents are stored in the memory 112 of the server 102. Image location tables 114-1 to 114-*n* which correspond one-to-one to the respective boot-up memory images 115-1 to 115-*n* are connected to the controller 113. By means of entries similar to the entry shown in FIG. 2, the image location tables 114-1 to 114-*n* hold the physical block address 121, offset in memory 122 and flag 123 of the corresponding boot-up memory images 115-1 to 115-*n*, respectively. Because the contents of the plurality of boot-up memory images 115-1 to 115-*n* are different, in general, the initial load images 116-1 to 116-*n* which constitute apart thereof are also different.

In each of the image location tables 114-1 to 114-*n*, the machine ID 132 included in the request 131 of FIG. 3A is ascribed as an index 135-1 to 135-*n*. The controller 113 retrieves the image location table 114-1 to 114-*n* having the same machine ID as the machine ID 132 included in the request 131 of FIG. 3A as the index 135-1 to 135-*n*, and executes the processing shown in FIG. 4 using the table of the image location tables 114-1 to 114-*n* retrieved.

Modified Example 2 of First Embodiment

In the first embodiment, a physical address is set for NULL (non-loaded) blocks at initialization and blocks are allocated in the main memory 151. However, for an OS in which physical addresses are not directly used in a boot-up memory image, a method is also available in which the main memory 151 is not allocated for NULL blocks at initialization (i.e., the physical block address is not explicitly set), and empty blocks of the main memory 151 are allocated in an on-demand manner.

In this Modified Example 2, in the image location table 114 of the server 102 the physical block address 121 in the entry of FIG. 2 is replaced with a logical block address, and the physical block addresses 134 and 141 of the request 131 and the reply 136 of FIG. 3 are replaced with logical block addresses. Then, in the processing of step S130 of FIG. 7 in the page table management unit 154, the block data loaded from the server 102 is written in empty blocks of the main memory 151. In the subsequent processing of step S131, the entry in which the logical block address 161 of FIG. 5 matches with the logical block address notified from the address translation unit 156 is retrieved from the page table 157, and the physical block address 162 of that entry is rewritten into the physical block address of the block of the main memory 151 which is the write destination in step S130. Further, the protection mode 163 thereof is rewritten into the value of the protection attribute 172 retrieved in step S128.

Second Embodiment

In the first embodiment, in the address translation unit which translates a logical address into a physical address, when an access from a program to a non-loaded block with a server location attribute occurred during system operation, data within an address range of a predetermined width including the physical address to which the access occurred is loaded from the server and written into the main memory. In this embodiment, in a memory access unit which receives the physical address relating to the memory access and controls access to the memory, when an access from a program to a non-loaded block with the server location attribute occurs during system operation, data within an address range of a predetermined width including the physical address to which the access occurred is loaded from the server and written in the main memory.

Figure 14:
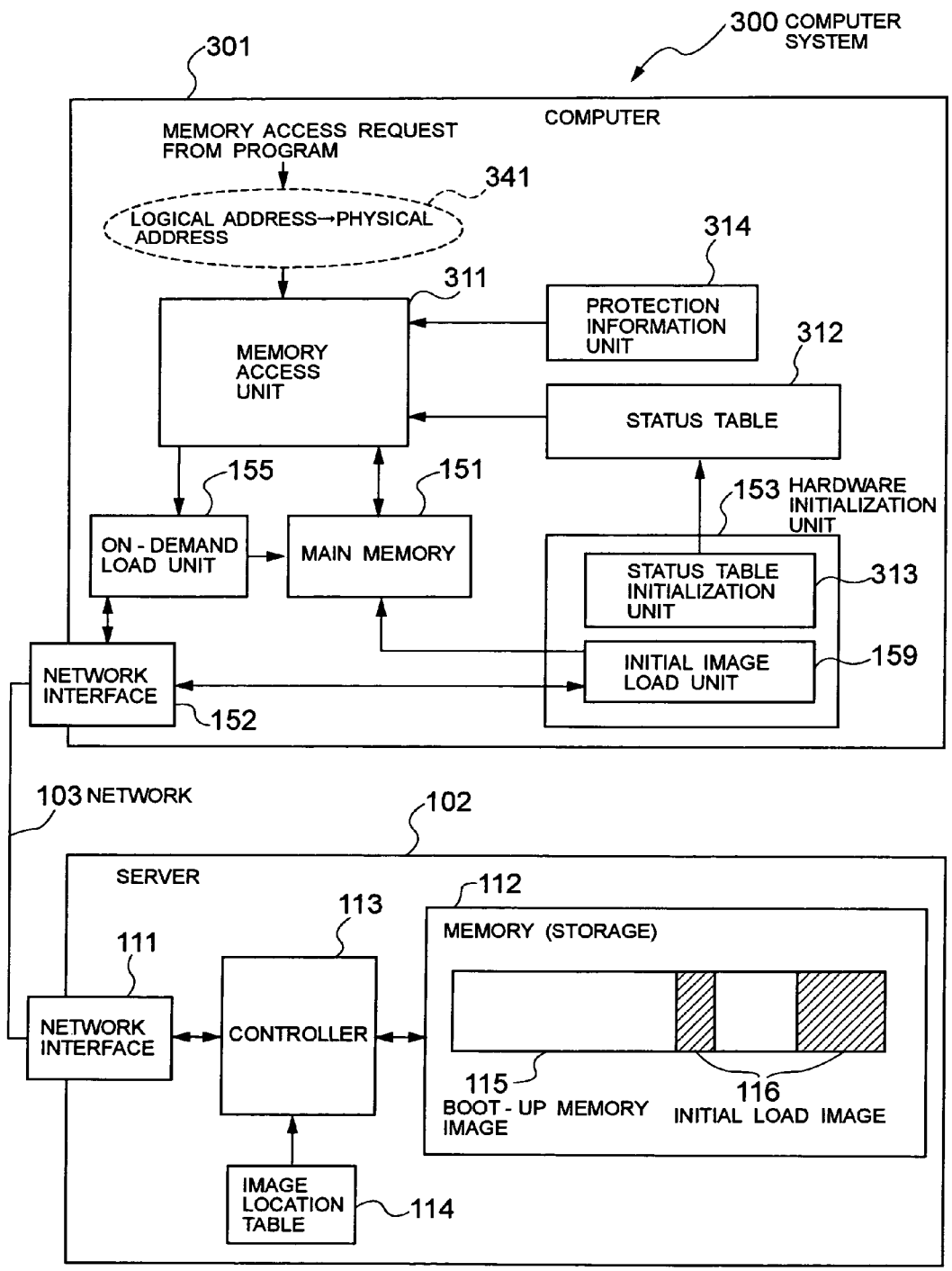
FIG. 14 is a block diagram of a computer system according to a second embodiment of this invention.

Referring to FIG. 14, a computer system 300 of the second embodiment of this invention comprises a computer 301 and a server 102. The computer 301 and the server 102 communicate with each other through a network 103. In this embodiment, although a configuration is illustrated in which the server 102 and the computer 301 comprise one unit, respectively, the server or the computer is not limited to one unit and a configuration which comprises a plurality of these units may be employed.

The differences between this embodiment and the first embodiment shown in FIG. 1 are on the side of the computer 301. The server 102 is the same as in the first embodiment.

The computer 301 has a main memory 151, a network interface 152, a hardware initialization unit 153, a memory access unit 311, a non-demand load unit 155, a status table 312 and a protection information unit 314. The hardware initialization unit 153 has an initial image load unit 159 and a status table initialization unit 313. The main memory 151, the network interface 152, the on-demand load unit 155 and the initial image load unit 159 are roughly the same as the corresponding elements in the first embodiment. The elements other than the main memory 151 and the network interface 152 comprise a data processor.

Figure 15:
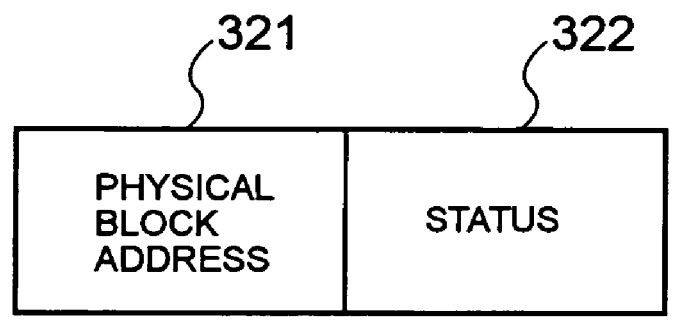
FIG. 15 is a view showing an example of a configuration of an entry of a status table in the second embodiment of this invention.

The status table 312 is a table which stores a status showing, for each block of the physical blocks, whether or not the block is loaded from the server 102. FIG. 15 shows an example of the configuration of an entry of the status table 312. The status table 312 is composed of a group of entries as shown in FIG. 15. Referring to FIG. 15, one entry holds a set of a physical block address 321 and a status 322. The status 322 is set to logical value 1 when the block of the physical block address 321 is loaded into the main memory 151, and is set to logical value 0 when the block is not loaded.

Figure 16:
FIG. 16 is a view showing an example of a configuration of an entry of a protection information unit in the second embodiment of this invention.

The protection information unit 314 is a table which stores the protection attribute of each block of the physical blocks. FIG. 16 shows an example of the configuration of an entry of the protection information unit 314. The protection information unit 314 is composed of a group as shown in FIG. 16. Referring to FIG. 16, one entry is a set of a physical block address 331, a protection attribute 332, and a location attribute 333. The protection attribute 332 is a read-only protection attribute or a read/write protection attribute. Which of these protection attributes is set is determined according to the original protection attribute of the block specified by the physical block address 331. The location attribute 333 is the same kind of attribute as the location attribute in the first embodiment (173 in FIG. 6), and takes a value of either "server" or "local".

The hardware initialization unit 153 performs initialization of each part of the system hardware at boot time of the computer 301. In this embodiment, the hardware initialization unit 153 comprises the status table initialization unit 313 in addition to the initial image load unit 159. The status table initialization unit 313 has a function which assigns physical addresses to the main memory 151 and a function for initializing the status table 312. However, dynamic assignment of physical addresses at the boot time is not a required item for this invention, and the invention can also be applied to a computer system in which physical addresses are assigned statically. At initialization of the status table 312, a status of logical value 0 indicating a non-loaded state is set for each physical block assigned to a block.

The memory access unit 311 accesses the main memory 151 in accordance with a memory access request from a program operating on the computer 301. When the computer 301 has a function 341 which translates into a physical address a logical address specified by a program at the time of a memory operation, as shown by the dotted line in FIG. 14, the memory access unit 311 inputs a memory access request including address information translated into a physical address. When the computer 301 does not comprise this function, if the logical address and the physical address are the same, the memory access unit 311 inputs a memory access including address information which is output from a program in the state in which the memory access is output.

For a memory access request for a non-loaded block, the memory access unit 311 comprises a function which refers to the status table 312 and the protection information unit 314. When it is necessary to load the access destination block, the function loads the block to write it into the main memory 151.

Figure 17:
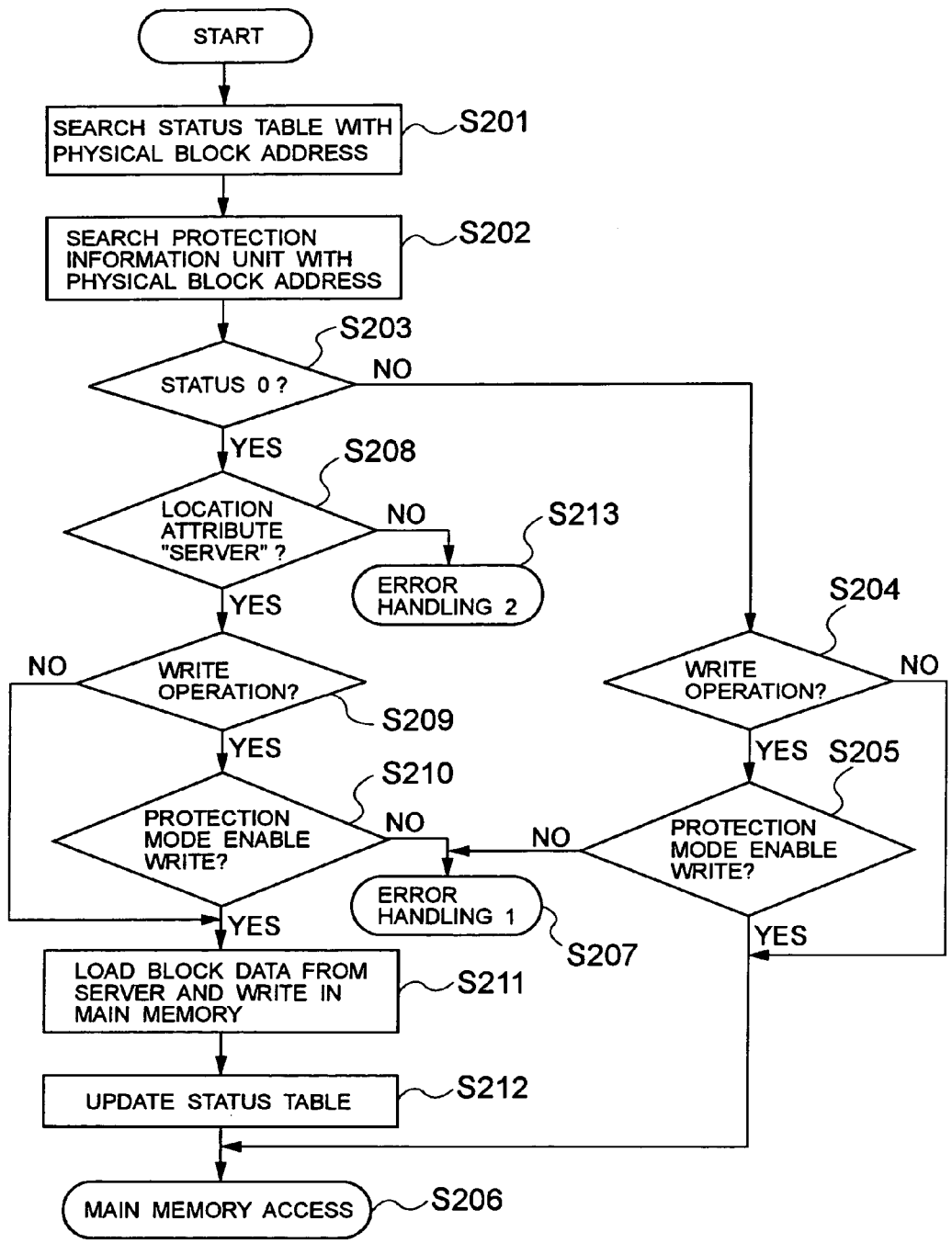
FIG. 17 is a flowchart showing an example of processing of a memory access unit in the second embodiment of this invention.

FIG. 17 shows one example of processing of the memory access unit 311. The memory access unit 311 searches the status table 312 and the protection information unit 314 using the block address in the physical address relating to the memory access, and loads an entry matching with the physical block address 321 shown in FIG. 15, and an entry matching with the physical block address 331 shown in FIG. 16 (step S201, S202). Next, the memory access unit 311 judges whether the status 322 in the entry loaded in step S201 is 0 (non-loaded) or 1 (loaded) (step S203). When the status 322 is 1 (loaded) (NO in step S203), the memory access unit 311 compares the access mode (write operation, read operation) with the protection attribute 332 of the entry retrieved in step S202 to verify whether or not the access is a valid access (steps S204 and S205). When the access is in valid, the memory access unit 311 performs an error handling 1 such as rejecting the current memory access as a protection attribute violation (step S207). When the access is valid, the memory access unit 311 accesses the main memory 151 at the physical address relating to the memory access (step S206).

In contrast, when the status 322 in the entry loaded in step S201 is 0 (non-loaded) (YES in step S203), the memory access unit 311 judges whether the location attribute 333 of the entry retrieved in step S202 is "server" or "local" (step S208). When the location attribute 333 is "local", the memory access unit 311 performs an error handling 2 such as rejecting the memory access (step S213). In this case, the error handling is normally performed using the OS which carries out on-demand memory allocation, and in OS processing following the error handling 2, processing such as allocating physical memory is performed. When the location attribute 333 is "server", the memory access unit 311 compares the access mode (write operation, read operation) with the protection attribute 332 of the entry retrieved in step S202 to verify whether or not the access is a valid access (steps S209 and S210). When the access is invalid, the memory access unit 311 performs an error handling 1 such as rejecting the current memory access as a protection attribute violation (step S207).

When the access is valid (YES in step S210), the memory access unit 311 loads the contents of the block specified by the physical block address of the memory access from the server 102 using the on-demand load unit 155 in the same manner as in the first embodiment, and writes it into a block of the main memory 151 (step S211). Next, the memory access unit 311 retrieves from the status table 312 an entry which matches with the physical block address input in the physical block address 321 of FIG. 15. It rewrites the status 322 of the block in the status table 312 to logical value 1 to indicate that the entry has been loaded (step S212), and accesses the main memory 151 at the relevant physical address (step S206).

Figure 18:
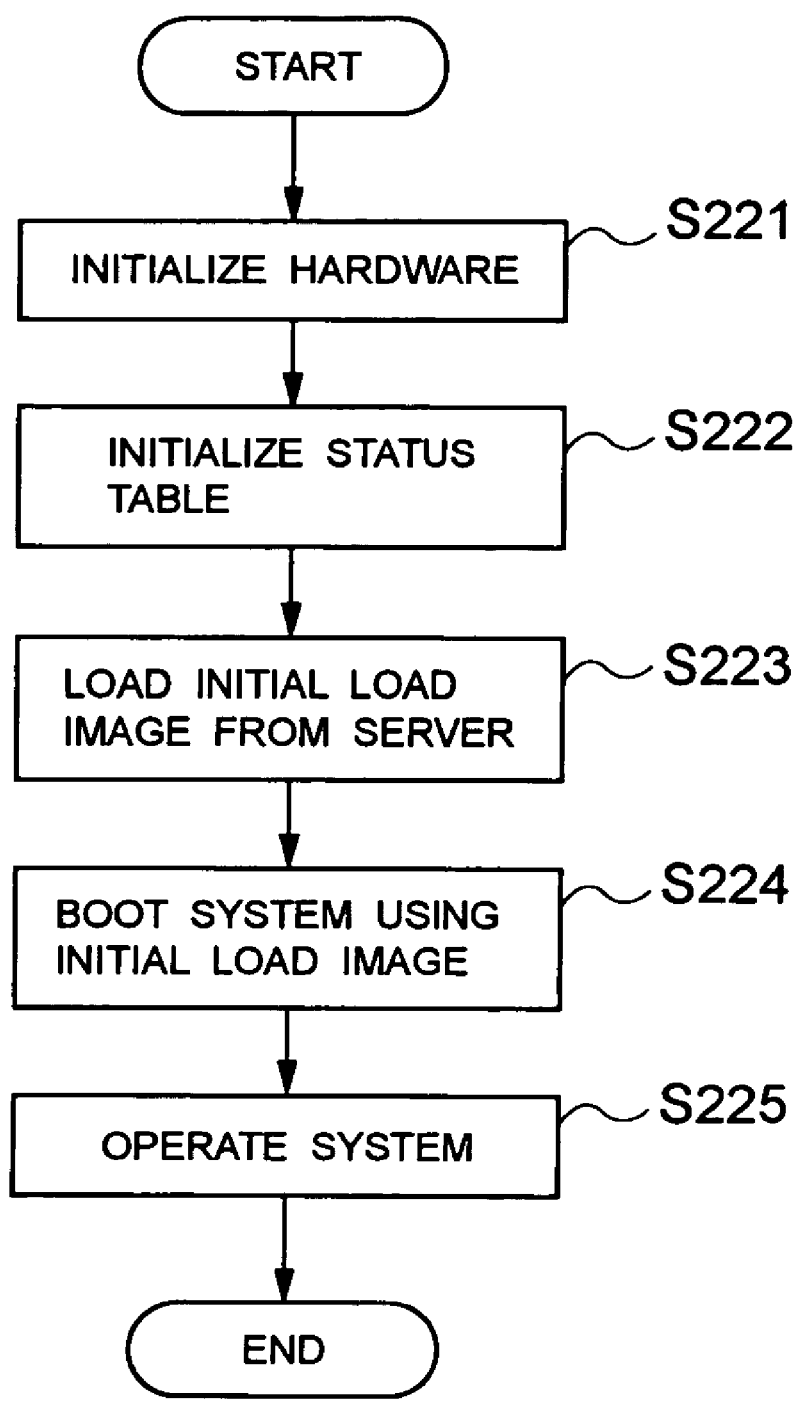
FIG. 18 is a flowchart showing an outline of operations of the second embodiment of this invention.

FIG. 18 is a flowchart showing an outline of the operations of the computer 301. Hereunder, the operations of this embodiment are described referring to the figures.

When the computer 301 is booted, as shown in FIG. 18, first, after initialization of hardware by the hardware initialization unit 153 (step S221), physical addresses are assigned in the main memory 151 by the status table initialization unit 313 to initialize the status table 312 (step S222). In the initial settings of the status table 312, the physical block address 321 and the status 322 of logical value 0 are registered in the status table 312 for all blocks.

Next, the computer 301 loads the initial load image 116 from the server 102 using the initial image load unit 159 in the same manner as in the first embodiment, and writes it into the main memory 151 (step S223). The computer 301 then boots the system using the initial load image 116 (step S224). Because the initial load image 116 is the same state as that immediately after booting of the OS and applications, the system returns to the environment that exists immediately after start-up. At this time, there is no suspended operation state from the time of boot-up based on the initial load image 116 until system operation (step S225) is enabled.

In the system operation stage (step S225), when a first access occurs from a program to a certain block in the boot-up memory image 115 which is other than the initial load image 116, because the status 322 of that block has been initialized as 0 (non-loaded) in the status table 312, the memory access unit 311 refers to the protection information unit 314 to judge the location attribute of the block including the physical address to which the access occurs (step S208 in FIG. 17). The memory access unit 311 then loads the contents of the block in question from the server 102 and writes the contents into the main memory 151 (step S211). Thereafter, it rewrites the status 322 of the block in the status table 312 to logical value 1 indicating that the blocked has been loaded (step S212), and accesses the main memory 151. As a result, the contents on the main memory 151 can be accessed immediately for this access and subsequent accesses to the block (step S206).

Next, this embodiment is described in further detail by means of an example.

Figure 19:
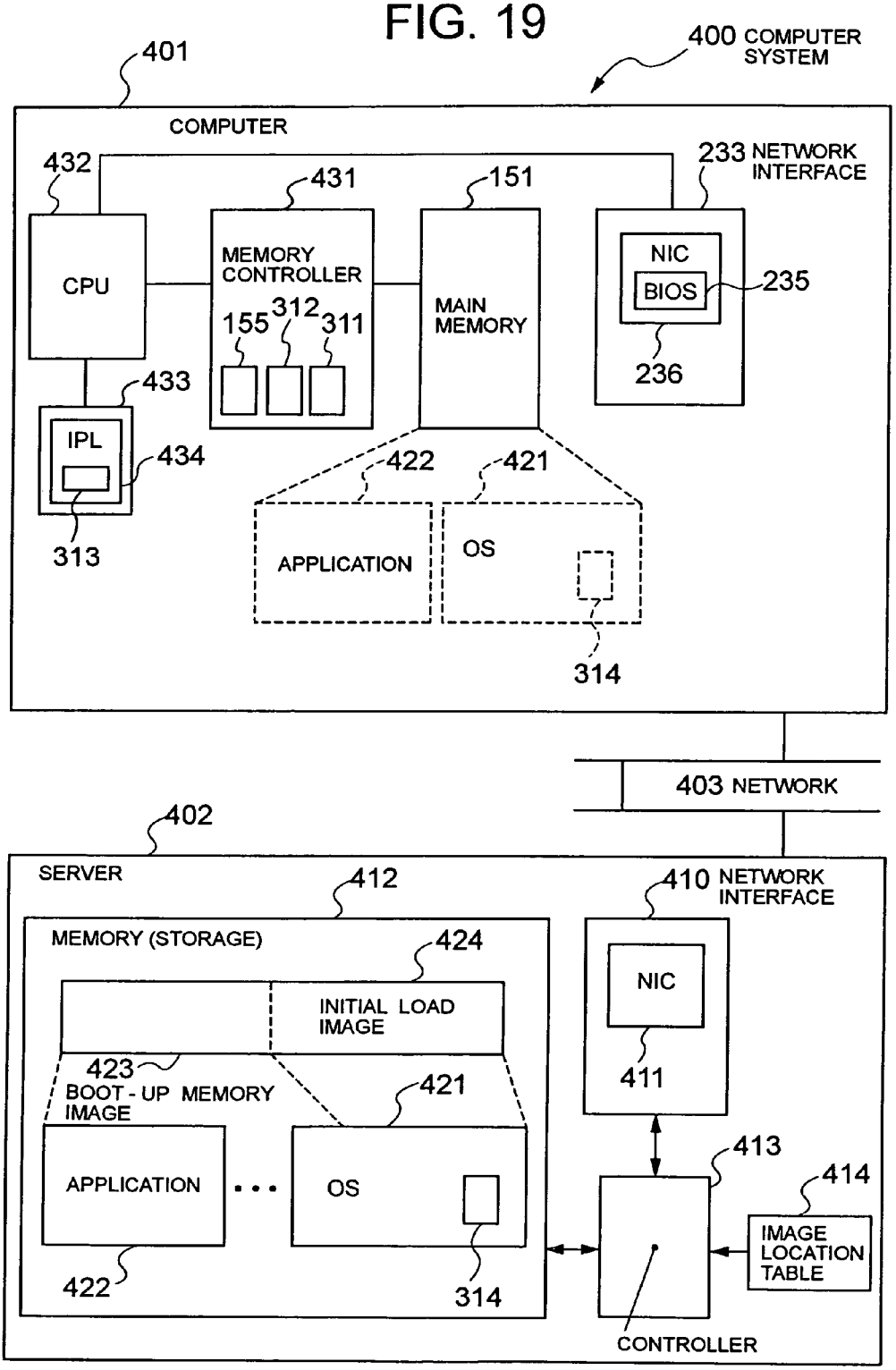
FIG. 19 is a block diagram of one example of the second embodiment of this invention.

A computer system 400 of FIG. 19 is one example of a computer system to which this embodiment was applied. The computer system 400 comprises a computer 401, a server 402 and a network 403. The network 403 connects the computer 401 and the server 402 to enable communication between them.

A boot-up memory image 423 is a memory state after initialization processing of an OS 421 and application programs 422, is previously stored in a memory 412 of the server 402, and one part thereof constitutes an initial load image 424. The initial load image 424 includes the protection information unit 314 of FIG. 14. A controller 413 comprises a CPU and a memory which stores programs operating on the CPU. The controller 413 is connected to the memory 412, an image location table 414 and a network interface 410. In the network interface 410, an NIC 411 for communicating with the computer 401 is provided.

In the computer 401, the main memory 151 is connected to a CPU 432 through a memory controller 431. The memory access unit 311, the on-demand load unit 155 and the status table 312 of FIG. 14 are housed in the memory controller 431. A network interface 233 and a ROM (PROM) 433 are connected as other hardware to the CPU 432. The network interface 233 is provided with a NIC 236 containing a BIOS 235. In this embodiment, the initial load image 424 is loaded from the server 402 using the function of the BIOS 235. More specifically, the BIOS 235 is equipped with a function of the initial image load unit 159 shown in FIG. 14. An IPL 434 having a status table initialization unit 313 is stored in the ROM (PROM) 433.

FIG. 20 shows an example of contents of the image location table 414 of the server 402. Referring to FIG. 20, the boot-up memory image 423 consists of blocks with the physical block addresses 256 to 400. The size of each physical block is 4096 bytes. The respective physical blocks are stored in regions 0x256000, 0x257000, . . . , 0x400000 onwards of the memory 412. Among these physical blocks, the flags of the 2 blocks with the block addresses 256 and 301 are set to value 1. This indicates that these 2 blocks are the initial load image 424.

FIG. 21 shows an example of contents of the protection information unit 314 of the OS 421. Referring to FIG. 21, in the protection information unit 314, among the plurality of blocks with the physical block addresses 256 to 511, the protection attribute allocated for the blocks with block addresses 256 to 300 is read-only (R), while the protection attribute allocated for the blocks with the remaining block addresses 301 to 511 is read/write (RW). The location attribute of the respective blocks with the physical block addresses 256 to 400 indicates that the data is on the server, while the location attribute of the respective blocks with the physical block addresses 401 to 511 indicates that the data is not on the server and can be freely used by the computer 401.

Hereunder, the operation of the computer system 400 of this embodiment is described.

When the computer 401 is booted, in step S221 of FIG. 18, the main memory 151, hardware such as the memory controller 431 and the network interface 233 are initialized. Thereafter, in step S222, the status table 312 inside the memory controller 431 is initialized by the status table initialization unit 313 implemented in IPL 434. As a result of this initialization, a status of logical value 0 that indicates a non-loaded status is set for all of the physical block addresses 256 to 511.

Figure 22A:
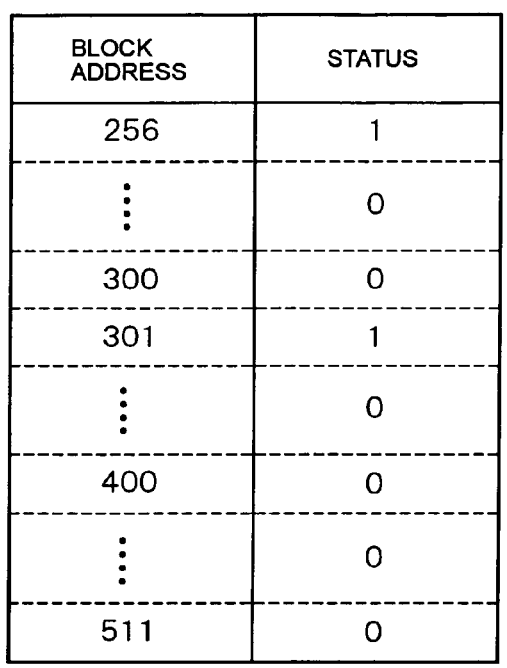
FIGS. 22A and 22B are, respectively, a view showing an initial state and a state after a change in a status table in one example of the second embodiment of this invention.

Next, in a similar manner to the example of the first embodiment, the initial load image 424 is loaded by the initial image load unit (BIOS 235) 159 and written into the main memory 151 (step S223). In this embodiment, after writing, the initial image load unit 159 updates the status table 312, whereby, as shown in FIG. 22A, each status of blocks belonging to the initial load image 424 is updated to 1 (loaded).

Next, in step S224 of FIG. 18, the CPU 432 boots the system using the initial load image 424 loaded from the server 402. More specifically, the IPL 434 sets the logical address of an instruction to be executed first when starting system operation in a program counter inside the CPU 432, and system operation is started by starting execution from that instruction.

Next, the operations carried out when programs executed on the CPU 432 access the main memory 151 in the system operation (step S225) stage are described. As examples, the following types of access are assumed:

(1) a first write access to a physical address having a physical block address "400";

(2) second and subsequent write accesses to the physical address having the physical block address "400"; and
(3) a read access to a physical address having a physical-block address "256".

First, the operations at the time of a first write access to the physical address having the physical block address "400" are described. In this case, the memory controller 431 searches the status table 312 using the physical block address "400", and loads the entry of "block address 400, status 0" of FIG. 22A (step S201 of FIG. 17). The memory controller 431 searches the protection information unit 314 using the physical block address "400", and loads the entry of "block address 400, protection attribute RW, location attribute server" in FIG. 21 (step S202). The memory controller 431 determines that the status is 0 (non-loaded) (YES in step S203) and that the location attribute is "server" (YES in step S208).

Figure 22B:
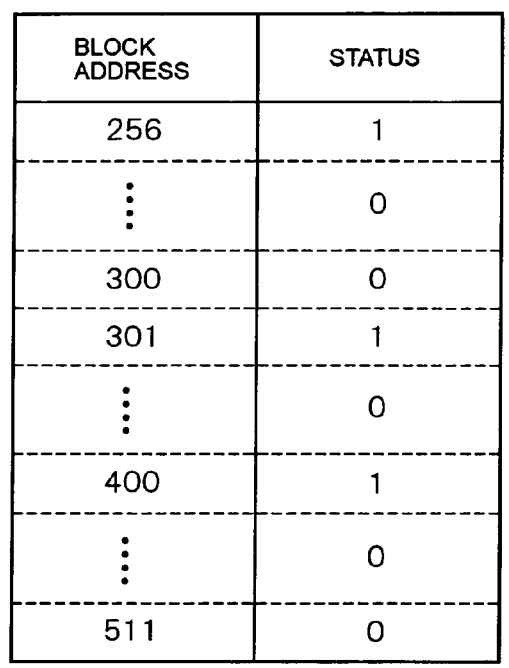

Subsequently, the memory controller 431 judges that the memory access is a write access (YES in step S209), and verifies that the loaded protection attribute is read/write (YES in step S210). The memory controller 431 then loads the contents of the relevant block from the server 402, and writes it into the block of the main memory 151 with the physical block address "400" (step S211). Next, as shown in FIG. 22B, the memory controller 431 updates the status of the physical block address "400" in the status table 312 from 0 to 1 (loaded) (step S212). The memory controller 431 then rewrites the data of the physical block address "400" in the main memory 151 using the data passed from the program (step S206).

Thus, after the start of system operation, when a first write access is made to a block of the boot-up memory image 423 which is other than the blocks belonging to the initial load image 424, the contents of that block are loaded from the server and written into the main memory 115, and then updating is performed. Although in this example a case is described of a write access, the same applies for a read access.

Next, the operations performed when second and subsequent write accesses are made to the physical address having the physical block address "400" are described. When the memory controller 431 searches the status table 312 using the physical block address "400", because the status table 312 is updated from the state in FIG. 22A to the state in FIG. 22B, the memory controller 431 loads the entry of "block address 400, status 1" (step S201). The memory controller 431 also searches the protection information unit 314 using the physical block address "400" and loads the entry of "block address 400, protection attribute RW, location attribute server" of FIG. 21 (step S202). Next, the memory controller 431 judges that the status is 1 (loaded) (NO in step S203). The memory controller 431 then judges that the memory access is a write access (YES in step S204), verifies that the loaded protection attribute is read/write (YES in step S205), and rewrites the data of the physical block address "400" on the main memory 151 using the data that was passed from the program (step S206).

Thus, after the start of system operation, when second and subsequent accesses are made to a block of the boot-up memory image 423 which is other than the blocks belonging to the initial load image 424, since an operation to load data from the server 402 which is performed for the first access is not necessary, the data present on the main memory 151 is immediately updated. The same applies for a case in which second and subsequent read accesses are made to a certain block which has the protection attribute R.

Next, the operations when a read access is made to the logical address having the logical block address "256" will be described. The memory controller 431 searches the status table 312 using the physical block address "256", and loads the entry of "block address 256, status 1" of FIG. 22B (step S201). The memory controller 431 also searches the protection information unit 314 using the physical block address "256", and loads the entry of "block address 256, protection attribute R, location attribute server" in FIG. 21 (step S202). Next, the memory controller 431 judges that the status is 1 (loaded) (NO in step S203). The memory controller 431 then judges that the memory access is a read access (NO in step S204), reads the data of the physical block address "256" in the main memory 151, and provides it to the program (step S206).

Thus, for a main memory access to a block belonging to the initial load image 424, an access operation to the main memory 151 is immediately executed from the first access.

Modified Example 1 of the Second Embodiment

Figure 23:
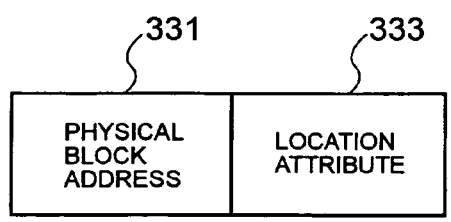
FIG. 23 is a view showing an example of a configuration of an entry of a protection information unit in Modified Example 1 of the second embodiment of this invention.
Figure 24:
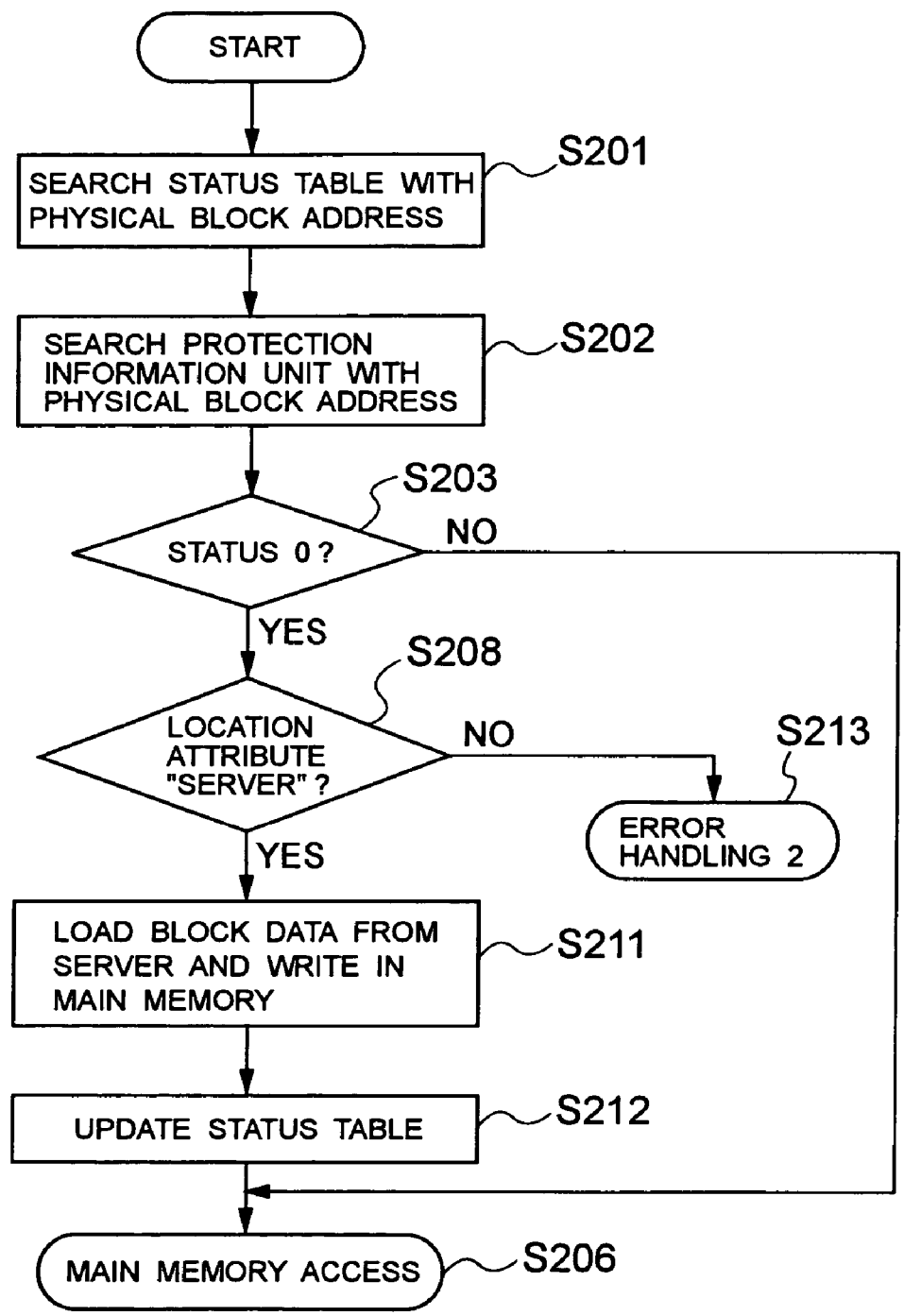
FIG. 24 is a flowchart showing an example of processing of a memory access unit in Modified Example 1 of the second embodiment of this invention.

In the second embodiment, the memory access unit 311 refers to the protection information unit 314 to check for a protection attribute violation. However, when the computer has a function 341 which translates a logical address specified by a program at the time of a memory operation into a physical address, as shown by the dotted line in FIG. 14, it is considered feasible to perform a protection attribute violation check at the stage of the function 341. It is also feasible to omit the protection attribute violation check itself. In this case, the entry of the protection information unit 314 differs to that of FIG. 16 in that, as shown in FIG. 23, it stores the physical block address 331 and the location attribute 333 but omits the protection attribute 332. Further, the processing of the memory access unit 311 shown in FIG. 17 is modified as shown in FIG. 24.

Modified Example 2 of the Second Embodiment

In the second embodiment and the above Modified Example 1, the protection information unit 314 is included in the initial load image 424 as one part of the OS, and written into the main memory 151. However, the protection information unit 314 need not be included in the OS, and instead may be included in the initial load image 424 as a table which is set in the memory controller 431 of the example shown in FIG. 19. In this case, when the initial load image 424 is loaded, the initial image load unit 159 may write the protection information unit 314 inside the memory controller 431.

According to this invention, the booting time of a computer using a network boot method can be significantly reduced. The reason is that, since a boot-up main memory image of an OS and application programs is loaded from a server and written into the main memory, the booting time can be reduced by the amount of time required for the initialization processing described in the programs. Since an initial load image that is only one part of the boot-up main memory image is loaded at boot time without loading all of the boot-up main memory image in one batch, and remaining parts are suitably loaded after the system starts operating, the communication time with the server can be reduced at boot time.

What is claimed is:
1. An apparatus, comprising:
a computer, configured to load an initial load image through a network from a server which manages a boot-up main memory image of an operating system and application programs as well as the initial load image as one part of a main memory image, to write the initial load image into a main memory and boot a system running on the computer using the written initial load image, wherein after the start of operation of the system running on the computer, when a first access occurs to a remaining part of the main memory image which is other than the initial load image, for each region of a predetermined width, the computer loads the main memory image from the server and writes the remaining part of the boot-up main memory image into the main memory.

2. The computer according to claim 1, wherein the initial load image includes at least the minimum text and data of the operating system which are required to boot the system running on the computer as well as programs and data which are necessary for the computer to load a block belonging to a main memory image part which is other than the initial load image in an on-demand manner from the server.

3. A computer consisting of a main memory, a network interface and a data processing unit, wherein the network interface is connected through a network to a server which manages a boot-up main memory image of an operating system and application programs as well as an initial load image which is one part of a main memory image, and the data processing unit comprises: means for loading the initial load image from the server through the network using the network interface and writing the initial load image into the main memory; means for booting a system running on the computer using the written initial load image; means for detecting, after the start of operation of the system running on the computer, that a first access occurs for each main memory image of a predetermined width, with respect to a remaining part of the main memory image which is other than the initial load image; and means for loading the main memory image of a predetermined width for which the first access is detected from the server through the network using the network interface, and writing the main memory image into the main memory.

4. A computer consisting of a main memory, a network interface and a data processing unit, wherein the network interface is connected through a network to a server which manages a boot-up main memory image of an operating system and application programs as well as an initial load image which is one part of a main memory image, and the data processing unit comprises: means for loading the initial load image from the server through the network using the network interface and writing the initial load image into the main memory; means for booting a system running on the computer using the written initial load image; means for generating, after the start of operation of the system running on the computer, an exception upon detecting that a first access occurs for each main memory image of a predetermined width, with respect to a remaining part of the main memory image which is other than the initial load image; and means for loading the main memory image of a predetermined width for which the exception is generated from the server through the network using the network interface, and writing the main memory image into the main memory.

5. A computer consisting of a main memory, a network interface and a data processing unit, wherein the network interface is connected through a network to a server which manages a boot-up main memory image of an operating system and application programs as well as an initial load image which is one part of a main memory image, and the data processing unit comprises: means for loading the initial load image from the server through the network using the network interface and writing the initial load image into the main memory; means for booting a system running on the computer using the written initial load image; a page table, which is included in the initial load image, for storing a protection mode and mapping information of logical block addresses and physical block addresses of the system running on the computer, wherein a predetermined protection mode which is unrelated to an original protection attribute is initialized regarding blocks belonging to a main memory image part other than the initial load image; a protection information unit for maintaining location attributes indicating whether or not the original protection attribute of each logical block of the system running on the computer and a physical block corresponding to the logical block are present on the server, wherein the location attributes is included in the initial load image; means for referring to the page table to translate a logical address included in a memory access request into a physical address, wherein the means for referring generates an exception when a protection mode of the access destination is the predetermined protection mode; means for judging from the protection information unit a location attribute of a block of the logical address for which the exception is generated, and when the location attribute indicates that the physical block is present on the server, for loading a main memory image of the physical block from the server through the network using the network interface to write the main memory image into the main memory; and means for changing a protection mode corresponding to the block of the logical address for which the exception is generated in the page table to the original protection attribute set in the protection information unit.

6. A computer consisting of a main memory, a network interface and a data processing unit, wherein the network interface is connected through a network to a server which manages a boot-up main memory image of an operating system and application programs as well as an initial load image which is one part of a main memory image, and the data processing unit comprises: means for loading the initial load image from the server through the network using the network interface and writing the initial load image into the main memory; means for booting a system running on the computer using the written initial load image; a status table for storing sets of a physical block of the system running on the computer and a status showing whether or not that physical block has been loaded, wherein at system boot time the status is initialized to a non-loaded state; a protection information unit for storing location attributes showing whether or not the respective physical blocks of the system running on the computer are present on the server; and a memory access unit for accessing the main memory in accordance with a memory access request, wherein, when a location attribute of a physical block of an access destination is set to a non-loaded state in the status table and the location attribute of that physical block is indicated as being present on the server by the protection information unit, the memory access unit loads the main memory image of that physical block from the server through the network using the network interface to write the main memory image into the main memory and changes the status in the status table to loaded.

7. A method for booting a computer, comprising the steps of:
    loading an initial load image through a network from a server;
    writing in a main memory of the computer the initial load image from the server, wherein the server manages a boot-up main memory image of an operating system and application programs as well as the initial load image as one part of a main memory image;
    booting a system running on the computer using the written initial load image; and
    loading, after the start of operation of the system running on the computer, for each region of a predetermined width, the main memory image from the server and writing the main memory image into the main memory of the computer, when a first access occurs to a remaining part of the main memory image which is other than the initial load image.

8. The method for booting a computer according to claim 7, wherein the initial load image includes at least the minimum text and data of the operating system which are required to boot the system running on the computer as well as programs and data which are necessary for the computer to load a block belonging to a main memory image part that is other than the initial load image in an on-demand manner from the server.

9. A method for booting a computer consisting of a main memory, a network interface and a data processing unit, comprising; a step of connecting the network interface through a network to a server which manages a boot-up main memory image of an operating system and application programs as well as an initial load image which is one part of a main memory image; in the data processing unit, a step of loading the initial load image from the server through the network using the network interface to write the initial load image into the main memory; a step of booting a system running on the computer using the written initial load image; after the start of operation of the system running on the computer, a step of detecting that a first access occurs for each main memory image of a predetermined width, with respect to a remaining part of the main memory image which is other than the initial load image; and a step of loading the main memory image of a predetermined width for which the first access is detected from the server through the network using the network interface to write the main memory image into the main memory.

10. A method for booting a computer consisting of a main memory, a network interface and a data processing unit, comprising; a step of connecting the network interface through a network to a server which manages a boot-up main memory image of an operating system and application programs as well as an initial load image which is one part of the main memory image; in the data processing unit, a step of loading the initial load image from the server through the network using the network interface to write the initial load image into the main memory; a step of booting a system running on the computer using the written initial load image; after the start of operation of the system running on the computer, a step of generating an exception upon detecting that a first access occurs for each main memory image of a predetermined width, with respect to a remaining part of the main memory image which is other than the initial load image; and a step of loading the main memory image of a predetermined width for which the exception is generated from the server through the network using the network interface to write the main memory image into the main memory.

11. A method for booting a computer consisting of a main memory, a network interface and a data processing unit, comprising; a step of connecting the network interface through a network to a server which manages a boot-up main memory image of an operating system and application programs as well as an initial load image which is one part of a main memory image; in the data processing unit, a step of loading the initial load image from the server through the network using the network interface to write the initial load image into the main memory; a step of booting a system running on the computer using the written initial load image; a step of referring to a page table which stores a protection mode and mapping information of logical block addresses and physical block addresses of the system running on the computer, in which a predetermined protection mode which is unrelated to an original protection attribute is initialized regarding blocks belonging to a main memory image part which is other than the initial load image to translate a logical address included in a memory access request into a physical address; a step of generating an exception when a protection mode of the access destination is the predetermined protection mode; a step of judging a location attribute of a block of the logical address for which the exception is generated from a protection information unit which stores location attributes showing whether or not the original protection attribute of each logical block of the system running on the computer and a physical block corresponding to the logical block are present on the server; when the location attribute indicates that the physical block is present on the server, a step of loading the main memory image of the physical block from the server through the network using the network interface to write the main memory image into the main memory of the computer; and a step of changing a protection mode corresponding to the block of the logical address for which the exception is generated in the page table to the original protection attribute which is set in the protection information unit.

12. A method for booting a computer consisting of a main memory, a network interface and a data processing unit comprising; a step of connecting the network interface through a network to a server which manages a boot-up main memory image of an operating system and application programs as well as an initial load image which is one part of a main memory image; in the data processing unit, a step of loading the initial load image from the server through the network using the network interface to write the initial load image into the main memory; and a step of booting a system running on the computer using the written initial load image, wherein a memory access unit accesses the main memory in accordance with a memory access request using a status table which stores sets of a physical block of the system running on the computer and a status showing whether or not that physical block is loaded, the status being initialized to a non-loaded state at system boot time, and a protection information unit which contains location attributes showing whether or not each physical block of the system running on the computer is present on the server, and when a location attribute of a physical block of an access destination is set to a non-loaded state in the status table and the location attribute of that physical block is indicated as present on the server by the protection information unit, and the memory access unit loads the main memory image of that physical block from the server through the network using the network interface to write the main memory image into the main memory, and changes the status in the status table to a loaded-state.

13. A server comprising: a memory for storing a boot-up main memory image of an operating system and application programs of a computer as well as an initial load image which is one part of a main memory image; a network interface for communicating with the computer through a network; and control means for, upon receiving a load request for the initial load image from the computer, reading the initial load image from the memory to send it to the computer which is the request source through the network using the network interface; and means for, upon receiving a load request from the computer for a remaining part of the main memory image which is other than the initial load image, reading the requested main memory image of a predetermined size from the memory to send it to the computer through the network using the network interface.

14. The server according to claim 13, further comprising an image location table having flags showing, for each region of a predetermined width of the boot-up main memory image, whether or not the region belongs to the initial load image, wherein the control means refers to the image location table to determine the initial load image.

15. A computer-readable medium storing, a computer program, which causes a computer comprising a main memory, a network interface and a data processing unit to function as: means for loading an initial load image through a network from a server which manages a boot-up main memory image of an operating system and application programs as well as the initial load image as one part of a main memory image to write the initial load image into the main memory; means for booting a system running on the computer using the written initial load image; means for detecting, after the start of operation of the system running on the computer, that a first access occurs for each main memory image of a predetermined width, with respect to a remaining part of the main memory image which is other than the initial load image; and means for loading the main memory image of a predetermined width for which the first access is detected from the server through the network using the network interface, and writes the main memory image into the main memory.

16. A computer-readable-medium, storing a server program, that causes a server comprising a memory which stores an initial load image which is one part of a main memory image of a boot up main memory image of an operating system and application programs of a computer, and a network interface which communicates with the computer through a network, to function as control means for, upon receiving a load request for the initial load image from the computer, reading the initial load image from the memory and sending it to the computer which is the request source through the network using the network interface, and upon receiving a load request from the computer for a remaining part of the main memory image which is other than the initial load image, reading the requested main memory image of a predetermined size from the memory, and sending it to the computer through the network using the network interface.

* * * * *